(12) United States Patent
Bryan et al.

(10) Patent No.: US 9,266,068 B2
(45) Date of Patent: Feb. 23, 2016

(54) AEROSOL GENERATOR FOR EPTFE FILTER TESTING AND METHOD OF USE

(71) Applicants: Eugene Bryan, Louisville, KY (US); Dan Milholland, Louisville, KY (US); Michael W. Osborne, Louisville, KY (US)

(72) Inventors: Eugene Bryan, Louisville, KY (US); Dan Milholland, Louisville, KY (US); Michael W. Osborne, Louisville, KY (US)

(73) Assignee: American Air Filter Company, Inc., Louisville, KY (US)

( * ) Notice: Subject to any disclaimer, the term of this patent is extended or adjusted under 35 U.S.C. 154(b) by 484 days.

(21) Appl. No.: 13/804,503

(22) Filed: Mar. 14, 2013

(65) Prior Publication Data

US 2013/0192344 A1   Aug. 1, 2013

Related U.S. Application Data

(63) Continuation-in-part of application No. 13/462,017, filed on May 2, 2012, which is a continuation of application No. PCT/US2011/059796, filed on Nov. 8, 2011.

(60) Provisional application No. 61/411,279, filed on Nov. 8, 2010.

(51) Int. Cl.
  *B01D 65/10* (2006.01)
  *B05B 7/24* (2006.01)
  *B01D 39/16* (2006.01)

(52) U.S. Cl.
  CPC .......... *B01D 65/102* (2013.01); *B01D 39/1692* (2013.01); *B05B 7/2494* (2013.01); *B01D 2239/0627* (2013.01); *B01D 2239/0654* (2013.01); *B01D 2273/18* (2013.01)

(58) Field of Classification Search
  CPC ............. B01D 65/102; B01D 39/1692; B01D 2273/18; B01D 2239/0627; B01D 2239/0654; B05B 7/2494
  USPC ........................................ 73/38; 239/310–318
  See application file for complete search history.

(56) References Cited

U.S. PATENT DOCUMENTS

| | | | |
|---|---|---|---|
| 3,495,440 A | 2/1970 | Koblin et al. | |
| 4,382,378 A | 5/1983 | Wadsworth et al. | |
| (Continued) | | | |

FOREIGN PATENT DOCUMENTS

| | | | |
|---|---|---|---|
| JP | 8136437 A | 5/1996 | |
| JP | 8238307 A | 9/1996 | |
| (Continued) | | | |

OTHER PUBLICATIONS

European Committee for Standardization, "High efficiency air filters (EPA, HEPA and ULPA)"—Parts 1-5, Nov. 2009, pp. 1-151, Brussels.

(Continued)

*Primary Examiner* — Hezron E Williams
*Assistant Examiner* — Marrit Eyassu
(74) *Attorney, Agent, or Firm* — Middleton Reutlinger; Robert H. Eichenberger; Chad D. Bruggeman

(57) ABSTRACT

Systems and methods for generating low or ultra-low concentrations of oil-based challenging compounds for filtration media are provided. Embodiments of the generators utilize bypass air in addition to the source of challenge. A HEPA filter which utilizes spunbond scrim material and ePTFE membrane for use in an aseptic pharmaceutical filtration air handling system for installation and testing is provided. The installation and testing configuration includes the ePTFE filter with a low or ultra-low concentration of challenging aerosol in the upstream side of the filter along with a scanning device for determining the upstream concentration, all completed in situ within a pharmaceutical air handling system. At the downstream side of the ePTFE filter is positioned another scanner which may be a discrete particle counter. The system and configuration allows for exposure to ePTFE filtration media for certification by low or ultra-low concentrations of oil based challenging compounds.

18 Claims, 27 Drawing Sheets

(56) References Cited

U.S. PATENT DOCUMENTS

| | | | |
|---|---|---|---|
| 5,076,965 A | 12/1991 | Guelta et al. | |
| 5,203,201 A | 4/1993 | Gogins | |
| 5,498,374 A * | 3/1996 | Sabroske | B05B 17/04 261/124 |
| 5,507,847 A | 4/1996 | George et al. | |
| 5,876,489 A | 3/1999 | Kunisaki et al. | |
| 6,269,681 B1 * | 8/2001 | Hara | G01N 15/0826 264/12 |
| 6,416,562 B1 | 7/2002 | Shibuya et al. | |
| 6,435,009 B1 * | 8/2002 | Tilley | A62B 27/00 73/40 |
| 6,561,498 B2 | 5/2003 | Tompkins et al. | |
| 6,627,563 B1 | 9/2003 | Huberty | |
| 7,614,280 B1 | 11/2009 | Gardner et al. | |
| 2003/0150255 A1 | 8/2003 | Hackett, Jr. | |
| 2008/0022642 A1 | 1/2008 | Fox et al. | |
| 2008/0236305 A1 | 10/2008 | Masset et al. | |
| 2008/0245041 A1 | 10/2008 | Choi | |
| 2009/0255325 A1 | 10/2009 | Morse et al. | |

FOREIGN PATENT DOCUMENTS

| | | |
|---|---|---|
| JP | 10244116 A | 9/1998 |
| JP | 2002243626 | 8/2002 |
| JP | 2007178082 | 7/2007 |
| WO | 2007015803 | 2/2007 |

OTHER PUBLICATIONS

Jornitz, M.W., Meltzer, T.H., "Filtration and Purification in the Biopharmaceutical Industry," Second Edition, Informa Healthcare, Drugs and the Pharmaceutical Sciences, vol. 174, pp. 627-639.

Kahler, C.J., Sammler, B., Kompenhans, J., "Generation and Control of Tracer Particles for Optical Flow Investigations in Air"; Abstract, 420 Session 7, (2002), Exp. Fluids 33, 736-742.

Roberts, R., "The Effect of PAO Aerosol Challenge on the Differential Pressure of an ePTFE Media ULPA (Experimental) Filter," Journal of the IEST 2003 Edition, pp. 74-76.

Wikol, M. et al, "Expanded Polytetrafluoroethylene Membranes and Their Applications," Filtration and Purification in the Biopharmaceutical Industry, Second Edition, Informa Healthcare, pp. 619-640.

FDA, "Draft Guidance for Industry Sterile Drug Products Produced by Aseptic Processing—Current Good Manufacturing Practice," Aug. 2003, Pharmaceutical CGMPs, pp. 1-59.

FDA, "Draft Guidance for Industry Sterile Drug Products Produced by Aseptic Processing—Current Good Manufacturing Practice," Sep. 2004, Pharmaceutical CGMPs, pp. 1-59.

Korean Intellectual Property Office; The International Search Report and the Written Opinion of the International Searching Authority, or the Declaration; International Search Report and Written Opinion for PCT/US/2011/059796; Jun. 27, 2012; pp. 1-10, Korean Intellectual Property Office, Korea.

* cited by examiner

AEROSOL GENERATOR FOR EPTFE FILTER TESTING AND METHOD OF USE

CROSS-REFERENCE TO RELATED APPLICATIONS

This current application is a continuation-in-part of, and claims priority to and benefit from, currently pending U.S. patent application Ser. No. 13/462,017, filed on May 2, 2012, which is a continuation of currently pending PCT International Patent Application Serial Number PCT/US11/59796, filed on Nov. 8, 2011, which claims priority to U.S. Provisional Patent Application Ser. No. 61/411,279, filed on Nov. 8, 2010.

TECHNICAL FIELD

The present invention relates generally to air filtration media testing using low concentrations of a challenging aerosol, and is well-suited for use in many different industries and applications, and is particularly well-suited for use in an aseptic pharmaceutical application and air handling system.

BACKGROUND

In most aseptic pharmaceutical cleanrooms, the final step in removing airborne particles occurs in a high efficiency particulate air (HEPA) or ultra-low penetration air (ULPA) filter that is delivering air into a controlled space. Whether the cleanroom attains and maintains its designed cleanliness class depends largely on the performance of these filters. Hence, it is a common and good practice to test the performance of all filters installed in cleanrooms to ensure that they meet the designed specifications. Filters are typically tested at the time of manufacture for overall efficiency and leaks. However, in some cleanrooms within regulated industries, such as the pharmaceutical industry, these filters are also required to be certified periodically to ensure acceptable performance during their service life. Various organizations issue recommended practices for certification of HEPA and ULPA type filters for filter leak tests and guidelines for testing and classifying such filters.

In current HEPA air filtration micro-glass media, the standard utilized in the pharmaceutical industry in aseptic processing has serious problems due to the media being fragile resulting in damage from handling, pressure, overloading and the like. Such damage can result in leaks of the filtration media thereby compromising functionality. Leakage and damage of microglass filtration media within the pharmaceutical cleanroom environment is significant such that the U.S. Food and Drug Administration has issued guidelines ensuring filtration effectiveness of microglass HEPA filters by testing on a regular basis. Testing of such microglass HEPA filters in such aseptic environment is completed using high concentration oil based aerosols such as DOP (dioctylphthlate), PAO (poly-alpha olefin), DEHS (Di-Ethyl-Hexyl-Sebacat), and other similar compounds measured by traditional photometers capable of measuring such upstream and downstream concentrations. The aerosols used for such filter leak tests and challenging of these filters should meet specifications for critical physicochemical attributes such as viscosity. Leakage threshold rates of 0.01% or greater of upstream concentration from these compounds is typically the testing limit at which the pharmaceutical installation and processing area would either have to replace the filter or repair the same. The upstream concentration typically is measured at the start and end of testing to ensure that the upstream challenge remains consistent over the life of the test. The filter face is scanned to identify defects in the filter media.

Since the 1960's HEPA filters have been tested using high concentrations (e.g., approximately 20 µg/liter) of aerosols such as PAO, DOP, DEHS, and other similar compounds. Traditionally, HEPA filters are tested with photometers which require a high (>10 µg/liter) upstream challenge concentration. Considering a leak size of 0.01% of the upstream concentration, this means that on the downstream side of the filter one must be able to detect a very small amount of PAO. The photometer has a lower limit of being able to measure small concentrations, which is why the larger upstream concentrations are required. A particle counter is another piece of equipment that can be used to leak test filters. Particle counters, unlike photometers, are only able to work with very low concentrations of PAO and are much more sensitive at very or ultra low concentrations of aerosol.

High concentrations of oil have a much greater impact on ePTFE than on glass media HEPA filters. Studies have shown that testing glass media HEPA filters with a photometer at high concentrations (e.g., approximately 20 µg/l) and with a particle counter at low concentrations (e.g., approximately 0.1 µg/l) yield consistent results in regards to sizing leaks. Therefore, there is a desire to develop test apparatus and methods for testing filters (especially, but not limited to, ePTFE HEPA filters) at low concentrations.

In general, however, there has not been a very convenient way to steadily produce a very low concentration of PAO. In the past a Laskin nozzle generator was used and the output was dumped into filters, or other output reduction methods were used. None of these have been ideal, however. The output of typical Laskin nozzle-based aerosol generators is governed by the amount of air flow exiting the nozzle tip. A standard Laskin nozzle requires approximately 2.65 cfm @ 20 psi of compressed air to enter the nozzle, thus resulting in 2.65 cfm of the aerosol mixture that will exit the generator. Air flow through the nozzle equates to flow combined with oil droplets out of the generator. In certain applications, the aerosol output of a generator operating on one Laskin nozzle will result in output concentrations with orders of magnitude higher than desired.

One possible solution to generating lower concentrations is to use a fraction of the Laskin nozzle output under the surface of the oil. Another possibility is to reduce the nozzle pressure. It is common practice to reduce the air pressure to a standard Laskin nozzle or to modify the nozzle by plugging one or more of the holes in the nozzle to reduce the overall aerosol output of the generator. The problem with using a smaller nozzle and/or lower nozzle pressures is that very little air passes through the nozzle and out of the tank. Another problem is that some specialized filter housings may require higher air flow. For example, some filter housings with aerosol injection/dispersion features are typically used with >2 cfm of airflow to inject the aerosol across the filter face. If very low flow were used, the aerosol may be difficult to be injected across the filter face in one of these units. Additionally, the time required for newly generated aerosol to exit the holding tank increases as nozzle flow decreases. This creates a slow response time in generator output at first startup or when attempting to change the nozzle pressure/generation rate of the generator. This increased exit time of the aerosol can also lead to an increase in aerosol particle size with time. A newly generated aerosol that is composed of small particles has a higher probability to grow in size by means of coalescence, ripening, agglomeration, etc., the longer it remains in a high aerosol concentration environment.

The DOP/PAO method for aseptic pharmaceutical room filtration application discussed above is required by regulation at least every 6-12 months by challenging the filtration media with a defined aerosol. The required aerosol challenge is maintained at a high concentration of about 20 µg PAO/L of air. A measurement of 15 µg of PAO/liter corresponds to about 20 grams of PAO/800 cfm filter/hour. For normal or standard microglass filtration media, a one-time oil based challenge compound may not negatively impact filter life of the media but may affect other structures of the filter. However, by testing at such concentrations on a regular basis, standard filter life including regular challenge testing can limit to less than five years the life cycle for microglass HEPA filtration.

In such standard challenging methodology for pharmaceutical applications and installs, a predefined challenging compound such as PAO is provided upstream of the filtration media in place. The PAO is injected into the airstream upstream of the in-situ media by nozzle or other known device at high concentration levels to properly determine filtration effectiveness. Injection devices such as a Laskin Nozzle create a poly-dispersed aerosol composed of particles with light scattering mean droplet diameters in the submicron size range. A challenge concentration, as mentioned, is provided up to about 20 µg/L which is continually introduced upstream of the filter for about three to four hours for a typical certification. An upstream challenging port in the filter housing is utilized for photometric analysis. The filter face is scanned on the downstream side with the photometer probe and leak sizes are calculated as a percent of the upstream challenge. Scanning is conducted on the entire face of the filter to generate proper leakage analysis. Probe readings of about 0.01% as leak criteria would be indicative of a significant leak but requires, as seen, fairly high concentrations of upstream PAO which can have deleterious effects on the filtering media and HEPA performance.

Significant problems also arise in the use of PAO challenge compounds. Significant fouling of the filtration media may occur over a plurality of challenging cycles. Further, such excessive challenging can cause the filter media to become less efficient, exhibiting more of a pressure drop and correspondent higher energy costs. Additionally, the PAO challenge compound has been shown to potentially cause damage to the filtering gel seals and gaskets resulting in potential leakage points. PAO may further cause liquification of silicon based gels or may harden or otherwise reduce the effectiveness of urethane based gel seals.

As a result, improved aerosol generators are required which can effectively produce aerosols of lower concentrations of appropriate challenge compounds to a filtration media, but which can do so consistently for the required amounts of time, and without causing excessive oiling or buildup on the filtration media, and without creating excessive pressure drop across the media.

Filter housings containing PAO dispersion manifolds can be used to provide a uniform aerosol distribution upstream of a filter when performing filter tests. These dispersion manifolds are designed to typically operate properly with a minimum of 2.65 cfm of air. When reducing the pressure below 20 psi for a full Laskin nozzle, or plugging a fraction of the nozzle holes, the output of the generator can fall below the optimal flow to effectively operate the dispersion manifolds. To compensate for the reduction of airflow through the generator outlet, one option is to increase the total output of the generator by adding additional supply air at the generator output. Under this operation, the newly formed aerosol exits the generator before combining with the additional supply air and the transit time for the aerosol to exit out of the holding tank is largely unaffected. However, if supply air is added at the generator output, there can be problems with the supply air not mixing properly with the generated aerosol.

Alternative aseptic pharmaceutical filter designs have included the use of additional pre-filter requirements which work to protect the primary filtration media during normal air handling load and during challenging. Prefilters typically are designed to prevent surface loading due to large particles, such as hair, etc. Such pre-filters, however, can foul earlier in the filter life cycle thereby requiring periodic replacement and increased maintenance costs. Such pre-filtering is undesirable in that additional filtration media is therefore required, doubling of maintenance and handling requirements are expected and a lack of efficiency and increased pressure drop result.

Other problems associated with traditional micro-fiberglass HEPA filters are that they are a relatively fragile filter medium which do not react well to handling, in-place contact, vibration, humidity possibly condensing on the filter media or the particle board frames, or chemical exposure. Such micro-fiberglass media may be readily damaged through normal handling. Damage resulting from these various factors can cause leakage and unfiltered air to pass through the media. Further, the filter can fail normal challenging sequences as a result of such damage to the media. Thus, it is desirable to provide a filtering media that meets full HEPA filtration requirements, may be utilized in the aseptic pharmaceutical industry environment, and is more durable for handling and more reliable in remaining fully functional after required integrity tests or challenging sequences and during normal course of operations.

In addition to filter loading, when considering testing of filters with the conventional use of PAO as a challenge aerosol, under certain conditions, bleed through can also be a potential issue. The issue of bleed through may occur when operating a thermal PAO generator at lower pressures to test ePTFE or glass media filters. This is due to the thermally generated aerosol having a 0.10-0.45 mass mean diameter which is closer to the MPPS of the filter. This creates an issue with a photometer measuring a concentration and looking for leaks at or above 0.01%. The bleed through could erroneously manifest itself as an artificially large leak or in some cases a continuous leak across the filter measuring >0.01%.

It is therefore desirable to provide a fully functional HEPA filtration media which meets all requirements, is relatively durable, may be challenged appropriately to determine filtering effectiveness and leakage and which further meets all required aseptic filtration standards. It is further desirable to provide such filtration media without additional pre-filter requirements and with appropriate methodology to determine full functionality of the media and determine possible leakage points without causing fouling of the in-situ filters.

It is also desirable to provide an aerosol generator capable of producing a steady, consistent output of low concentration challenge compound so as to be compatible with the use of discrete particle counters used for leak testing filter media.

Thus, there is a need in the art to provide a fully functional aseptic pharmaceutical filter media which has associated full testing methodology, is durable, maintains HEPA filtration efficiencies and which has a long in-place filtration life.

SUMMARY

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed. It should also be appreciated that terminology explicitly employed herein that also may appear in any disclosure incorporated by reference should be accorded a meaning most consistent with the particular concepts disclosed herein.

It is therefore one aspect of the present invention to provide a replacement material and certification testing for leak size and detection of aseptic cleanroom filtering media which utilizes a significantly lower resistant media, thereby substantially reducing energy costs.

It is further desirable to provide a method for certification and testing of media in such conditions using ultra-low concentrations of PAO and a means for detection of the ultra-low concentrations downstream of the filter to determine leak size and filter condition.

It is further desirable to provide an aerosol generation system that supplies an aerosol of challenge material to a filtration media for testing purposes that decreases the likelihood of excessive oiling or occlusion of the filter media.

In another aspect of the present invention, it is desirable to provide a more robust alternative to micro-fiber glass filtering media in such an environment.

It is therefore one aspect of the present invention to integrate ultra-low level PAO testing and challenging of ePTFE HEPA filtration media in an aseptic cleanroom environment. It is a further aspect of the present invention to provide an ePTFE bi-component filtration media which may be appropriately tested and certified on a regular basis for efficiency and leakage with an aerosol without fouling of the ePTFE membrane or filter media.

In some embodiments, the filter system and media of the system described herein includes a dual layer bi-component media of spun-bond material, the bi-component material being a combination of PET (polyethylene terephthalate) and PE (polyethylene) with a total weight of about 80 GSM (grams per square meter) for both layers and a combined stiffness of about at least 400 Gurley.

In various embodiments, the dual layer of bi-component material may include a density of about 8 PPI with an average pleat height of about 25 to about 55 mm. Optimally, in many embodiments, the pleat height will be about 35 mm.

In some filters, the pleat separators can be a clear poly-alpha olefin separator bead applied in between each pleat to assure pleat separation and spacing. In other filters and embodiments, the pleats can be formed by embossing a pattern in the media that assures pleat separation and spacing.

In other aspects, the specially formulated ePTFE membrane thickness may be about 8 to about 15 microns and preferably about 10 microns.

In some aspects, the bi-component filter material may be laminated with the ePTFE membrane at about 160 degrees C.

In various aspects, the resulting material can be rolled and then later pleated as set forth for insertion into air filter assemblies which can include metal gel seal, neoprene or knife edge frame types.

Upon insertion of the ePTFE HEPA filter at an installation, some aspects set forth herein can include regular certification and leakage testing by use of ultra-low PAO challenging aerosol at down to about 0.010 μg PAO/L of air and up to about 1.0 μg/L. More particularly and alternatively, concentrations of about 0.1 μg/L PAO to about 0.5 μg/L with a combination of particle sizes of about 0.3 μm to about 0.5 μm particle count sizing can be used. Correspondingly, a discrete particle counter can be combined with the aerosol generator for challenging and leakage testing, in various embodiments, which can include a counter able to test at 0.5 μm to about 0.3 μm or smaller μm channel size.

In other embodiments, microspheres (polystyrene latex or other materials) may be generated as a challenging material and read on the downstream side of the filtering membrane using a particle counter to similarly determine leakage and filter efficacy. In various examples, microspheres sized from 0.12 and up to 1.00 μm can be utilized. Similar testing and challenging concentrations can as well include challenging measurements of $20\times10^6 \geq 0.3$ μm particles of PAO per $ft^3$ to about $7\times10^6 > 0.5$ μm particles of PAO per $ft^3$.

Generally, in the various examples and embodiments provided, a filter and testing methodology is provided wherein a specialized ePTFE HEPA filter may be utilized and appropriately challenged for certification purposes while maintaining the efficiency and efficacy of the filtering media. Usage of the various embodiments described herein provides alternative testing and certification methodology for cleanroom application of ePTFE filtering media without the significant drawbacks of high volume PAO aerosol testing previously seen in the art. Usage of the types of generators described is not limited to any particular filter embodiment.

It is therefore one aspect of the present invention to provide a system for installation and testing of ultra-low concentration challenging PAO or other type of aerosol upstream of an ePTFE HEPA filter for use in aseptic pharmaceutical cleanrooms wherein the challenging concentrations of the PAO or other aerosol is less than about 1.0 μg/L air challenge aerosol with an associated low or ultra-low concentration upstream scanner (such as, but not limited to, a particle counter or photometer), in conjunction with a downstream ultra-low concentration particle detector or other scanner for determination of downstream concentration of the challenging aerosol. To measure a 0.01% leakage rate based on a 1.0 μg/L down to about 0.3 μg/L and further down to about 0.1 μg/L and lower upstream challenge aerosol concentration, a photometer or detector downstream must be sensitive and accurate for measuring a 0.01% leakage rate of the upstream PAO challenge concentrations, or a downstream concentration of less than 0.0001, 0.00003 and further down to about 0.00001 μg/L and lower concentrations, which can be problematic for today's current photometer technology. Such low challenging concentrations thus results in significantly extended challenge life of the filtering media, i.e. total exposure time of the ePTFE media to the PAO, oil based or other type of challenging aerosol. Such low exposure times significantly extend the testing and installation life of an ePTFE filter media filter requiring regular leakage certification.

Various methods of use include installing an ePTFE based filter into an aseptic pharmaceutical installation, introducing an ultra-low challenge concentration of a challenging aerosol, measuring the upstream concentration of the aerosol at the filter face, scanning the downstream side of the filter face, detecting the infinitesimal concentration of aerosol on the downstream face of the ePTFE filter by utilization of a discrete particle counter or photometer and calculating leak sizes based on the ratio of the measured downstream to upstream concentrations.

In other embodiments, the method further incorporates installation and leakage testing of ePTFE filtration media in an aseptic filtration environment including installing a filtration media having an upstream spunbond scrim material or upstream support scrim and a downstream spunbond scrim material or downstream support scrim, interposing an ePTFE membrane between the upstream scrim material and the downstream scrim material, injecting into the upstream air a low or ultra-low concentration of challenging aerosol at or below 1.0 μg aerosol/L air down to about 0.10 μg aerosol/L air or below (approximate equivalent to >6 million particles), measuring the concentration of the challenging aerosol at the upstream spun bond scrim material, allowing the challenging aerosol to penetrate through defects in the ePTFE membrane, measuring the concentration of the challenging aerosol at defect locations by particle detection at the downstream spunbond scrim material to a value as low as from 0.0001 μg aerosol/L air or lower to 0.00001 μg/L, calculating a leakage size within the media to values down to a leakage threshold rate of about 0.01% of the upstream challenging concentration.

Various methods may further include installing a downstream particle scanner for measuring the concentrations at the downstream spunbond scrim material. The scanner may be a discrete particle counter. In other variations, the method may further comprise transmitting the concentration measurements of the upstream scanner to a computer, transmitting the concentration of measurements of the downstream scanner to a computer, calculating a leakage percentage of the challenging aerosol through the ePTFE filtration media over a predetermined period of time.

Alternatively, various methods may further include installing a communication link between an upstream scanner and a downstream scanner, transmitting the concentration measurements of the upstream scanner to a reading device, transmitting the concentration of measurements of the downstream scanner to the reading device, calculating a leakage percentage of the challenging aerosol through the ePTFE media by a processor, and reporting the calculated percentage to a user.

Various systems and methods may also include exemplary solutions which incorporate a divergent or secondary air supply (bypass air) that serves as an aerosol carrier, chamber purge, and/or dilution source. By incorporating a bypass source of air through the holding tank or at the tank outlet, the output flow of the generator can be increased. The addition of bypass air through the holding tank will increase the output while simultaneously reducing the time the newly generated aerosol remains in the holding tank. In addition, the newly generated aerosol is also pre-mixed with the bypass air in the holding tank prior to exiting the generator. Although the bypass air provides benefits with high concentration/flow output generators, the advantages of the bypass air are most significant when assisting low output/flow systems.

A further embodiment may include a system for in situ testing of a filtration media that includes a filtration media for positioning within an air stream of an air stream handling system. An aerosol generator positioned upstream of the filtration media and includes a substantially closed tank configured for containing a liquid there within and a void space above a top surface of the liquid. The aerosol generator includes a generation nozzle located in the holding tank that includes a nozzle outlet located below the liquid top surface. The generation nozzle supplies a first air source or source of pressurized supply air. The aerosol generator includes a bypass nozzle located in the holding tank, with the bypass nozzle supplying a second air source or source of bypass air either above or below the top surface or liquid level. A tank outlet for discharging an aerosol from the substantially closed tank to the air stream handling system. An upstream scanner detects the aerosol produced by the aerosol generator at an upstream side of the filtration media. A downstream scanner detects the aerosol passing through the filtration media. Alternatively, the second air source or source of bypass air may be supplied to the tank outlet of the holding tank.

One embodiment of the aerosol generator may include a substantially closed tank configured for containing a liquid there within and having a void space above a liquid level or top surface of the liquid. At least one generation nozzle located in the holding tank includes a nozzle outlet located below the liquid level. The at least one generation nozzle supplies a first air source or source of pressurized supply air. A bypass nozzle located in the holding tank supplies a second air source or source of bypass air. A tank outlet discharges an aerosol from the substantially closed tank.

Another embodiment of a method of in situ testing of a filtration media may include the steps of providing an air handling system having a filtration media interposed between an upstream environment and a downstream environment. Providing an aerosol generator positioned upstream of the filtration media. The aerosol generator includes a substantially closed tank configured for containing a liquid there within and a void space above a top surface of the liquid. The aerosol generator includes a generation nozzle located in the holding tank having a nozzle outlet located below the top surface. The generation nozzle supplies a first air source or source of pressurized supply air. The aerosol generator includes a bypass nozzle located in the holding tank that supplies a second air source or source of bypass air. A tank outlet for discharging an aerosol from the substantially closed tank to the air stream handling system. Injecting into the upstream environment the aerosol from the aerosol generator. Providing an upstream scanner for detection of the aerosol from the aerosol generator at an upstream side of the filtration media. Providing a downstream scanner at a downstream side of the filtration media for detecting the aerosol passing through the filtration media. Measuring an upstream concentration of the aerosol in the upstream environment. Measuring a downstream concentration of the aerosol having flowed through the filtration media in the downstream environment. Calculating a leakage rate based on a comparison of the upstream concentration to the downstream concentration.

Various embodiments of the present invention provide a particle generator system including a source of compressed air, a secondary source or divergent source of air (bypass air), a liquid holding tank which contains a sufficient void between the liquid surface and tank top, a generation nozzle or plurality of nozzles immersed in the liquid, a nozzle inlet to the liquid holding tank, a secondary inlet to the liquid holding tank that serves as the inlet to a source of clean bypass air, and an outlet on the liquid holding tank for discharging the aerosol.

These and other variations of the system and method for leakage detection in an ePTFE filter media for use in an aseptic pharmaceutical environment are further described herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 12 is a flow chart detailing the machinery and steps involved in creating an ePTFE filtration media having an upstream scrim, a downstream scrim and an ePTFE membrane laminated there between;

DETAILED DESCRIPTION

Figure 1:
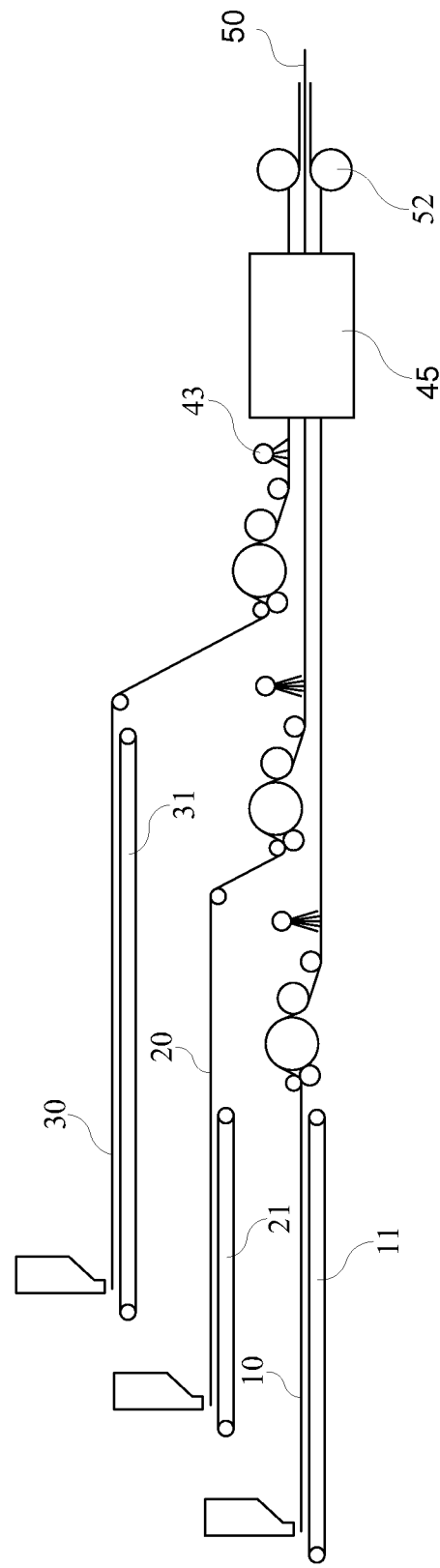
FIG. 1 is a side view of one embodiment for machinery which makes the filter media described herein.
Figure 2:
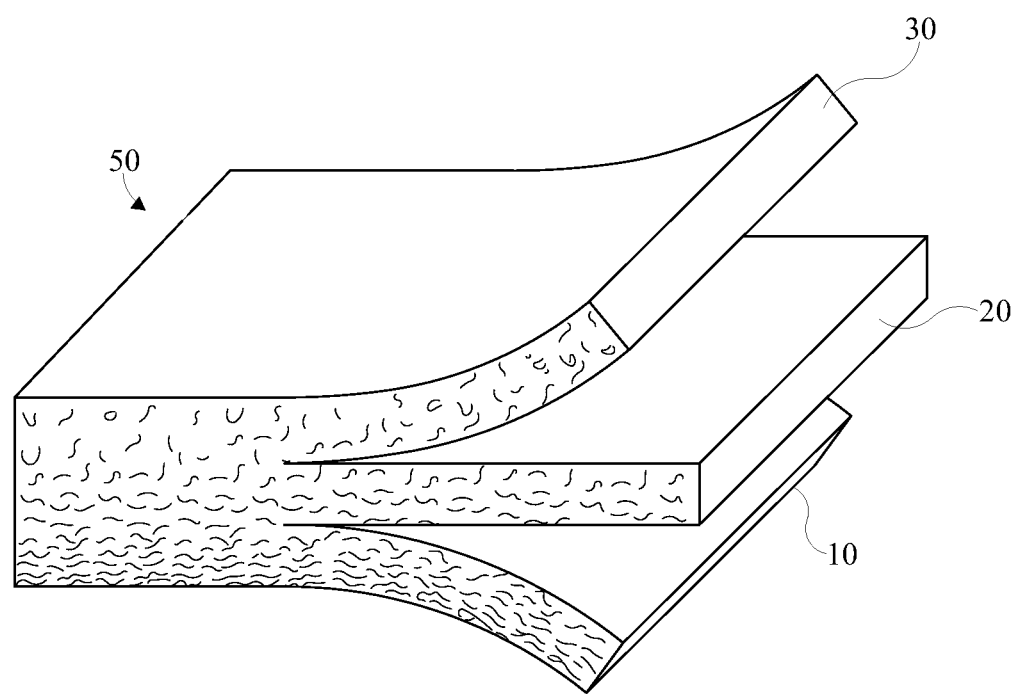
FIG. 2 is a sectional view of the filter media according to one aspect of the present invention.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, the aspects of a fluid filtering system disclosed herein are described in conjunction with a plurality of filter structures that are arranged in a specific fashion and that interface with other structural components of the fluid filtering system in a specific fashion. However, one or more aspects of a fluid filtering system described herein may be implemented with filter structures arranged in alternative configurations and/or with filter structures that interface with other structural components of the fluid filtering system in alternative ways. Also, for example, as described in additional detail herein, filter structures disclosed herein may vary in one or more respects from those specifically depicted herein. Implementation of these and other variations is contemplated without deviating from the scope or spirit of the claimed invention.

In FIGS. 1 through 10, various aspects of an exemplary filter structure 118 are depicted. In the various figures, several embodiments for production and assembly of the filter media and system described herein are shown. In other figures, embodiments of the machinery for manufacturing the multi-layer HEPA filter are also depicted. In still other figures and embodiments, multiple aspects of a separator used for separation of the filtering pleats are also shown and depicted. The embodiments and variations of the filters herein are able to be used in combination with the testing and challenging methodology described herein to ensure filter and seal integrity. Such testing methodology provides the ability to challenge a HEPA ePTFE filter with low volume or ultra-low volume PAO or PSL microspheres at various amounts and concentrations while also detecting possible leakage or damage to the filtering media. Such low or ultra-low volume and concentration challenge methodology combined with an ePTFE HEPA filter ensures low concentration exposure of PAO to the upstream side of the ePTFE filtering media by a selectably controllable nozzle or PSL generator. Further, concentrations and leakage determination can be calculated by a particle counter positioned to scan the filtering media surface on the downstream side of the media.

By low and ultra-low concentrations of challenging aerosol, it is meant that the concentrations are about 1.0 µg aerosol/L air down to about 0.01 µg aerosol/L air and below for ultra-low volumes, as well as detection of concentrations at an ultra-low values by a factor of 0.0001 (0.01%) indicating a detectable concentration of down to about 0.000001 µg aerosol/L. air. Thus, downstream ultra-low particle detection is required to be able to detect such low concentrations of challenging materials using, among other devices, a discrete particle counter.

As set forth herein, a method for use and testing of an ePTFE filtering media is provided. The ePTFE HEPA filter is suitable for use in an aseptic pharmaceutical environment and is combined with a routine testing challenge which ensures filter integrity. As summarized herein, several embodiments of the filter and testing methodology include a HEPA filter having a bi-component scrim wherein an ePTFE membrane is laminated between a top and a bottom bi-component layer. The HEPA ePTFE filtering material may be utilized with a corresponding PAO testing and challenging regimen which includes low concentration PAO exposure to the air stream with the HEPA ePTFE filter in place while utilizing a particle counter to determine corresponding pass through of the PAO challenge material. Detection of even minute particles of PAO by the particle counter may indicate damage to the filter which may then be correspondingly repaired or replaced as needed. By utilizing a pairing of an ePTFE filter with an ultra-low concentration PAO challenge and a particle detector, use of a HEPA ePTFE filter without fouling of the membrane by the PAO is accomplished.

As shown in FIG. 1, an exemplary machine for combining the bi-component layers 10 and 30 which are moved by belts 11 and 31 with the ePTFE membrane 20 is shown. Belt 21 feeds the specially formed membrane 21 sandwiched between two 40 gsm spunbond bi-component non-woven layers 10 and 30. The upper and lower layers 30 and 10, respectively, can be of various types of filtering media for lamination with ePTFE membranes that are known in the industry and the specific types of media utilized herein are not to be deemed limiting. A HEPA ePTFE bi-component filter as described herein may exhibit an initial air flow resistance value which is 50% less than a standard HEPA glass media filter typically used in such environment. Such filter may be tested for certification in some embodiments using the methodology described herein utilizing ultra-low concentrations of PAO or microspheres along with a discrete particle counter to determine leak size and leakage indicative of damage to the filtering media.

The two spunbond layers 10 and 30 may be selected to provide a total weight of about 80 gsm combined such that each individual layer may be more or less than the exemplary 40 gsm layer as needed for the specific application and to provide a good laminating surface for bonding with the ePTFE membrane 20. The bi-component layers may also be selected to provide a combined stiffness of at least about 400 Gurley. These bi-component materials may be selected from many known members but, in various embodiments, polyethylene and PET may be combined to form the spunbond bi-component material. As indicated, an exemplary specification for the scrim may be a PE/PET bi-component spunbond scrim for lamination purposes. In various embodiments, each layer may have a basis weight of 40±3 g/m2 and a thickness of 0.25±0.05 mm. An exemplary air permeability is greater than about 350 cfm with a tensile strength of MD>100 N/5 cm and CD>30.

Figure 3:
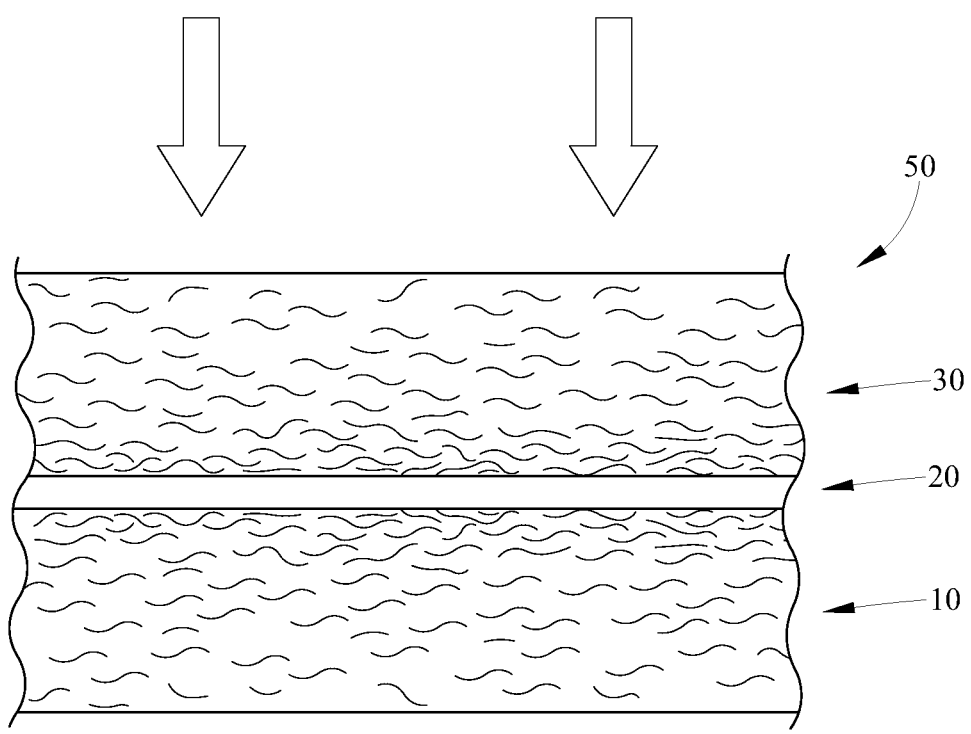
FIG. 3 is a close up side view of the filter media shown in FIG. 2.

Returning to FIG. 1, bi-component layers 10 and 30 are fed by belts 11 and 31 to a laminating station or combination area 45 wherein ePTFE membrane 20 is fed by belt 21. Combined filtering media layer 50, shown in FIGS. 1, 2, 3, and 5A, depicts the bi-component layers laminated to the ePTFE membrane 20. As seen in FIG. 1, laminating station 45 bonds the membrane to the layers 10 and 30 at a temperature of about 165 C to about 175 C at a speed of about 20 to 30 m/min. Pressure rollers 52 are also provided to ensure proper laminating of the two layers 10, 30 with the membrane 20 after application of the laminating heat. Similarly, FIG. 2, while not shown to scale, depicts the membrane layer 20, which is fed from a roll after being previously mixed and formed, in between the lower and upper scrim or scrim support layers 10 and 30, respectively. Once heat treated and properly laminated by the laminating station 45 and rollers 52, the combined ePTFE filtering media 50 is depicted in FIG. 3 with upper and lower layers 30, 10 positioned opposite each other and heat laminated/bonded with the membrane 20.

In the present embodiment, the combined filtering media 50 is a HEPA filter mat having fiber diameters of between 0.5 and 2.0 micrometers. As is known, HEPA filters remove at least 99.97% of the airborne particles 0.3 µm (micrometers) in diameter. While the spunbond scrim layers do not provide membrane-like entrapment filtration, they are combined with an actual membrane layer 20 where particles are actually trapped by the tendrils of the ePTFE membrane material. The ePTFE membrane 20 depicted herein provides unique characteristics in combination with the scrim layers as well as the specific testing and challenging methodology using ultra-low PAO concentrations preventing fouling of the membrane by the PAO and maintaining filter efficiency even after multiple certification challenges.

Figure 12:
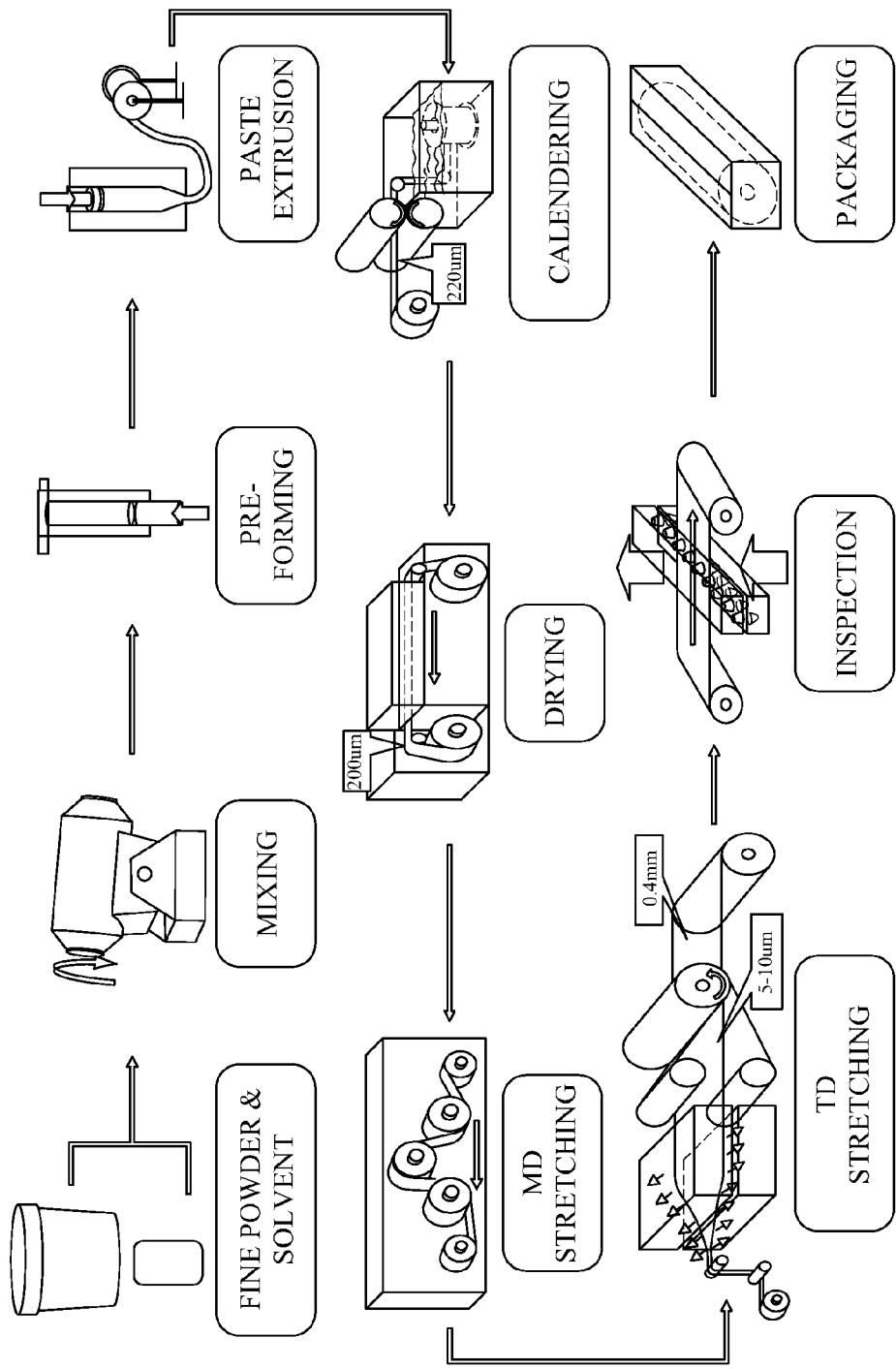

With reference now to FIG. 12, the specialized ePTFE membrane 20 utilized herein is created from a fine powder PTFE material, for example a powder from Daikin called Polyflon PTFE F-135. The fine powder utilized has a standard specific gravity of about 2.149 to about 2.165 and a bulk density of about 0.42 to about 0.54 g/ml. The fine powder further has a particle size distribution of 400-650 µm.

The fine PTFE fine powder is then mixed with an oil at a ratio of about 33% into a doughy billet. The mixing oil may be IP Solvent 2028 with a viscosity of 3.01 m·Pa·s/at 20 degrees C. and a density of 213 to about 262 g/cm$^3$ at about 15 degrees C. This mixture is brought to a boiling point at about 213 to about 262 C with a mixing time of about 10 minutes. Once the material is thoroughly mixed, it can be stretched into a membrane or film through both TDO (transverse direction orientation) and MDO (machine direction orientation) stretching. Initially, an MDO stretch is accomplished at a 5:1 ratio and at a temperature of about 50 degrees C. Three rollers are utilized in MDO stretching, each roller heated to about 250 degrees C. After completion of the MDO stretch, a TDO stretch is accomplished at a ratio of about 30-50 to 1. The membrane is preheated at a temperature (Duct temperature/IR temperature) of about 200/200 degree C., a stretching temperature of 300/300 degree C. and a heat set temperature of about 370/450-560 (adjustable, where higher temperature, lower pressure drop) degrees C. The Duct temperature is the temperature inside the oven and the IR temperature is the temperature towards the membrane. Once the membrane is formed, it can be rolled for later use and combination within a scrim layer for formation of an ePTFE filter material.

An exemplary process for creation of the ePTFE membrane for use in the filter media and method steps discussed herein is shown in FIG. 12. As can be seen, the fine powder solvent is combined with mixing oil and finely mixed. The paste is then pre-formed and then extruded through an extruder for calendering to a roll of membrane at about 220 μm. Once it is calendered, a roll of ePTFE membrane is formed which may then be sent to a dryer for adequate drying so that the membrane may be stretched as necessary to prepare for lamination at an appropriate thickness. Variant TDO/MDO stretching may be imparted onto the ePTFE membrane such that after lamination to the scrim material, including in the varying embodiments of a bi-component scrim discussed herein, the combined media exhibits the necessary and desired pressure drop and efficiency appropriate for the desired application.

After completion of the TD stretching as depicted in FIG. 12, the membrane 20 has a thickness of between about 6 to 10 μm prior to combining with the upper and lower bi-component scrim layers 30, 10 as shown. The combined HEPA ePTFE media exhibits a total thickness of about 0.40 mm with a range of between 0.25 and 0.55 mm. Further, the basis weight, in varying embodiments, is shown to be about 81 g/m$^2$ with a range of between about 76 and about 86 g/m$^2$. Further, the average pressure drop of the combined media produced with the ePTFE membrane made and applied as set forth herein with an airflow velocity of 0.053 m/s is about 11.73 mm H$_2$O with a range of about 10.20 to about 15.26 mm H$_2$O.

Referring again to FIG. 1 there is shown an example of an alternative embodiment and machine designed for combination of the dual scrim layers and the ePTFE membrane 20. After combining the multiple layers together, the combined filtering material 50 may be fed into a laminating machine 45 as discussed herein. The lamination speed for bonding of the membrane to the bi-component layers 10, 30 is approximately 20-30 m./min. and results in a combined HEPA ePTFE filtering media having a pressure drop of about 100-150 Pa. and a related efficiency of greater than 99.94%. Such ratings are exhibited with a testing condition of air stream velocity of 0.053 m/s with a silica aerosol.

In some embodiments the ePTFE membrane 20 may include a single or multiple layers with a minimum thickness of about 5 micron and preferably about 10 micron in thickness. However, both porosity and pressure drop may be balanced in the membrane to maintain desired energy efficiency, so various thicknesses may be similarly utilized to create similar energy efficiency. As formed herein, the ePTFE membrane is filled with a number of large nodes and fine fibrils which allow for tolerance of low concentrations of PAO, DOP, DEHS or other test aerosols.

Figure 14:
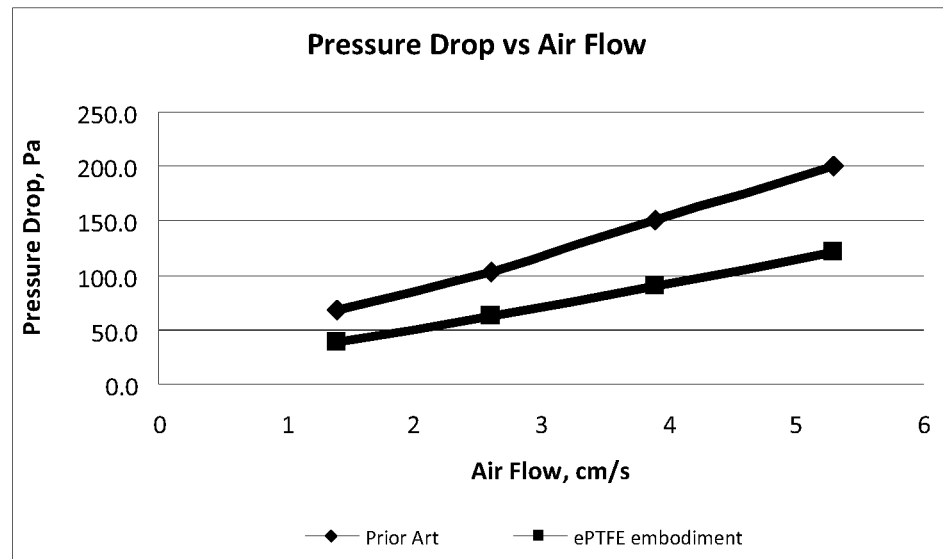
FIG. 14 is a chart illustrating pressure drop versus air flow comparing a prior art filtering media to a filter media according to one aspect of the invention.
Figure 15:
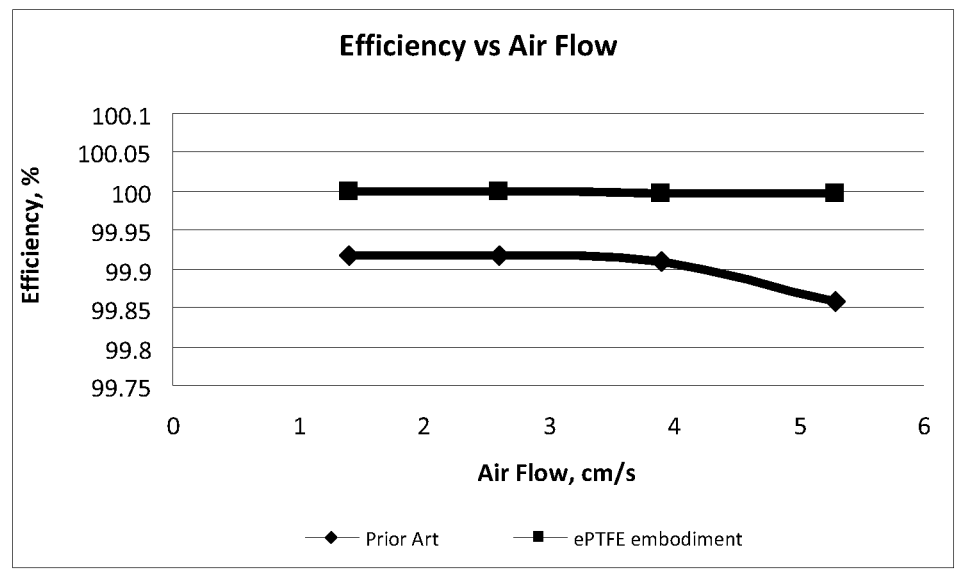
FIG. 15 is a chart illustrating efficiency versus air flow comparing a prior art filtering media to a filter media according to one aspect of the invention.

As shown in FIG. 14 and FIG. 15 (wherein the diamond dotted line represents a prior art filtering media and the square dotted line represents an exemplary embodiment of a HEPA ePTFE dual layer scrim material described herein), the combined ePTFE membrane and scrim material exhibits significant beneficial pressure drop and efficiency characteristics as compared to other known HEPA ePTFE filtering media.

Figure 4:
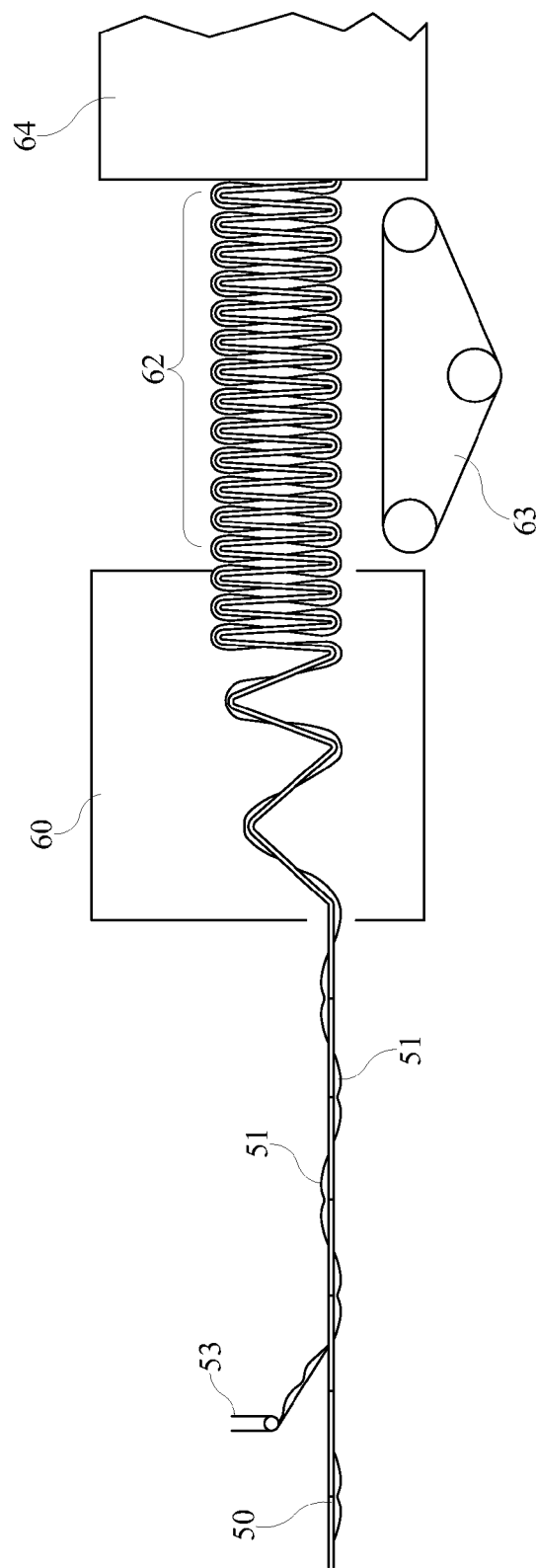
FIG. 4 is an exemplary pleating machine used in making pleated filters according to one aspect present invention.
Figure 5A:
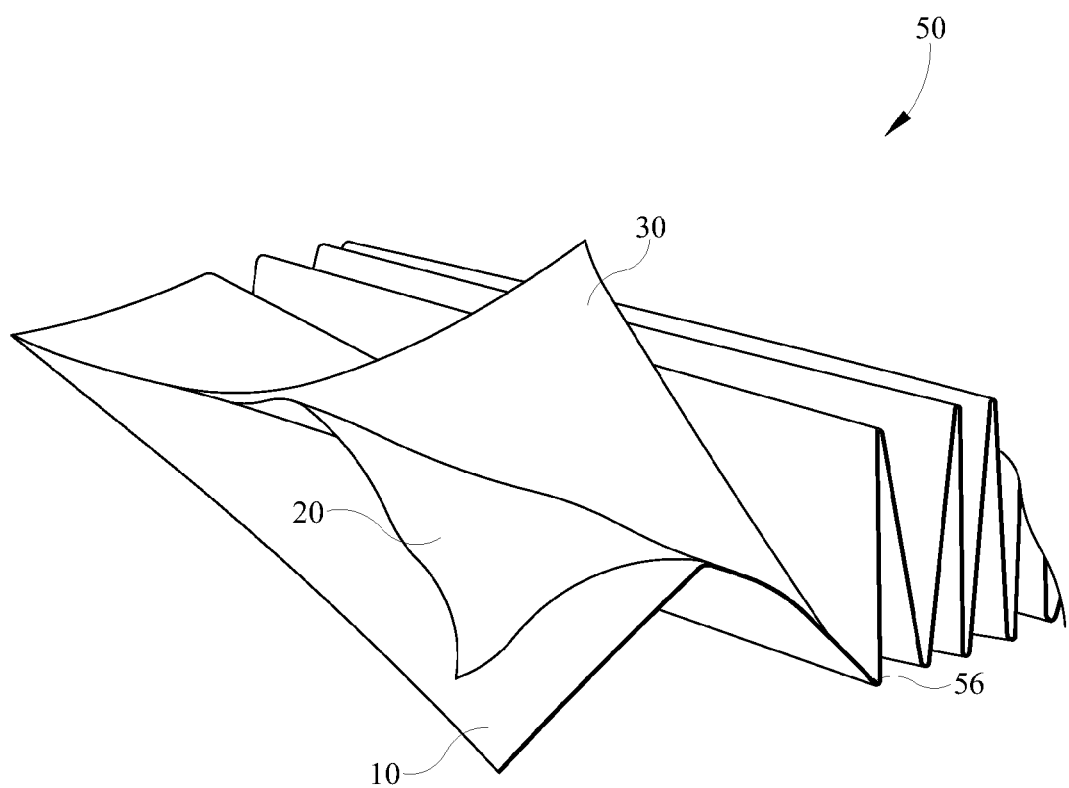
FIG. 5A is a perspective view of a sample sheet of a pleated filter media with one embodiment of a spacer as set forth herein.
Figure 5B:
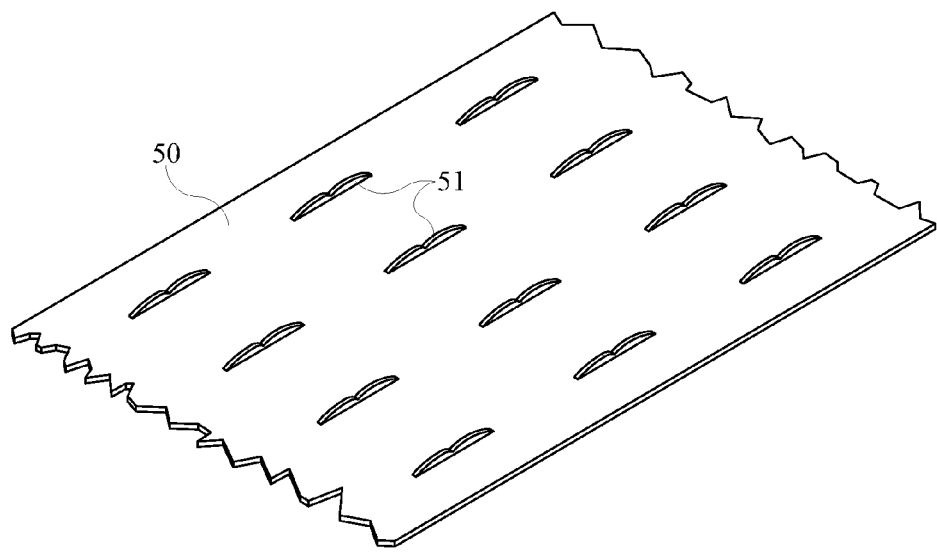
FIG. 5B is a perspective view of a sample sheet of a pleated filter media with an alternative embodiment of a spacer as set forth herein.
Figure 5C:
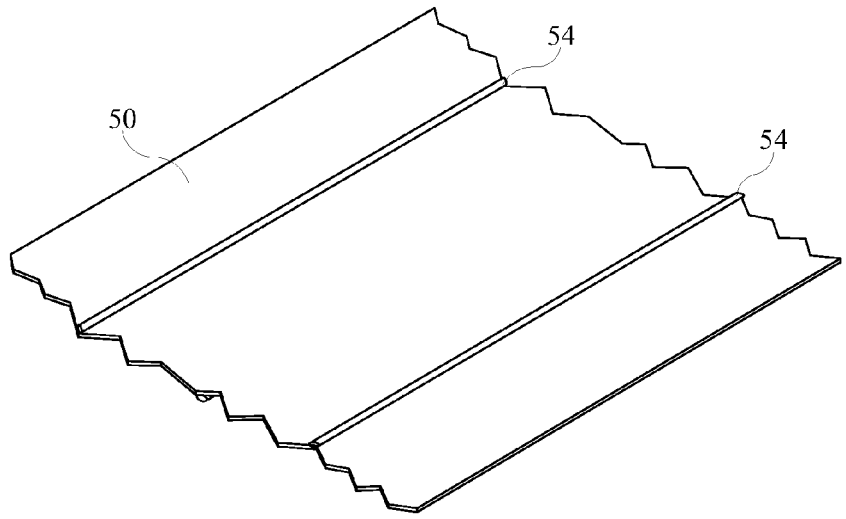
FIG. 5C is a perspective view of a sample sheet of a pleated filter media with a further alternative embodiment of a spacer as set forth herein.

Referring now to FIG. 4, the combined laminated media 50 is prepared for pleating by initially unrolling the combined media and feeding to a belt for conveyance to a pleating apparatus 60. As is understood, pleating is accomplished through many processes and the one depicted is only provided as a means to describe one of a number of processes for pleating, crimping, and folding the ePTFE pleated filter media. Further, the depiction shown in the figures is for descriptive and explanatory purposes. Prior to pleating of the media 50, an injector nozzle 53 provides separator material 51 on the filter media which are used to ensure proper separation of adjacent pleats formed from the media by the pleating machine. Failure to sufficiently separate the pleats can cause the pleats to collapse under the pressure of active airflow. By providing spaced separators, maintenance of the pleat structure is assured to allow for adequate surface area of the filtering media, pleat positioning and efficacy.

Separators 51, depicted in several embodiments of FIGS. 4, 5B, 5C, 6A and 6B, may be of many types of construction. This includes simple beads, sections, bow tie structures, elongated lines or other configurations. Many variations of separator construction may be utilized in order to assure proper pleat position and separation, including embossing the media and even using hot melt to secure the media in place. Separators may also include mechanical separators and spacers as well as bead type separators. The disclosure herein of the multiple separators is provided for exemplary purposes and no unnecessary limitation of such disclosure is to be construed as the teachings hereof are considered to cover equivalent structure for separator functionality.

Figure 6A:
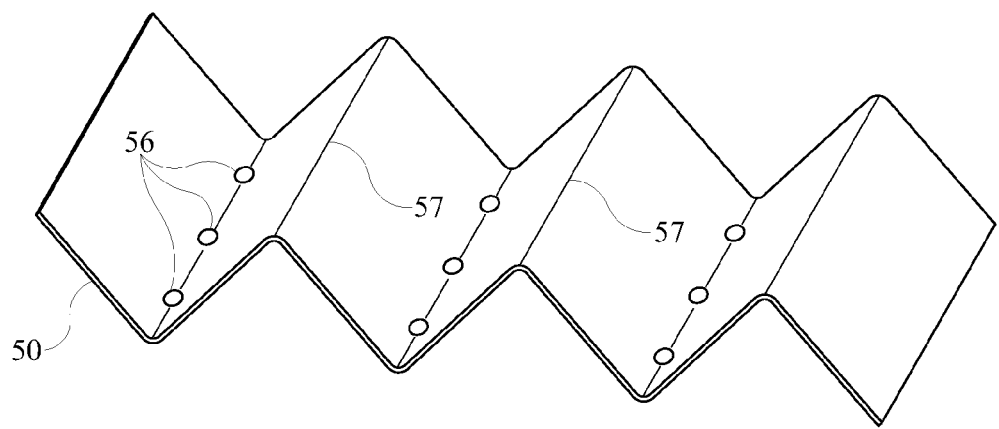
FIG. 6A is an upper perspective view of a sample sheet of a pleated filter media having individual spacer materials inserted into the filter pleats as described herein.
Figure 6B:
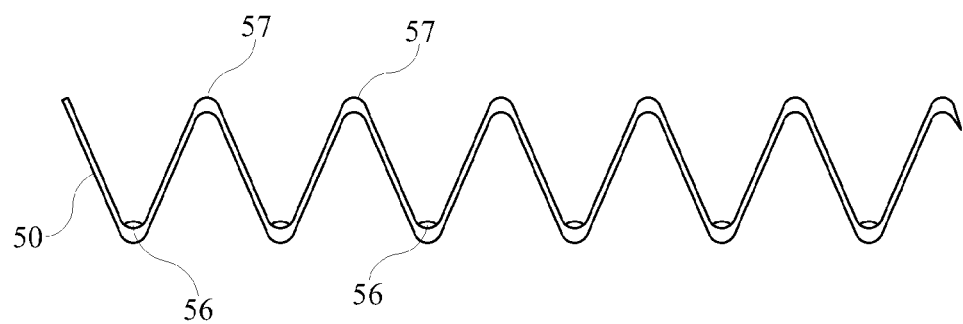
FIG. 6B is a side view of the sample sheet of FIG. 6A.

Bead type separators 56, shown in FIGS. 6A and 6B, are positioned along opposite fold lines 57 to ensure proper pleat positioning. The separators are of a preselected chemistry and quantity in accordance with the geometry and material composition of the filter media, namely size, weight, depth, and breadth. Such separators are positioned so that the opposite pleat faces forming the pleat valleys are spread and maintained a desired preselected position with the valleys being unrestricted for free flow of the fluid stream through the pleated media.

In many embodiments, the separator material may be a clear material which does not interact with the PAO or other challenging aerosol used in the certification challenging steps described herein. For example, the separator material may be poly-alpha olefin which is clear and which does not discolor the adjacent ePTFE media when exposed to PAO oil aerosol.

Returning to FIGS. 4, 5B, 5C, 6A and 6B, the material is folded by a pleating apparatus 60 via many known mechanisms such as using scoring and crimping rollers as are known. A plurality of pleats 62 are created and back plate 64 maintains compressive pressure on the newly pleated filtering media. A pleating conveyor 63 advances the pleated material towards the back plate while the plate expands to accept oncoming additional filtering media.

Figure 7:
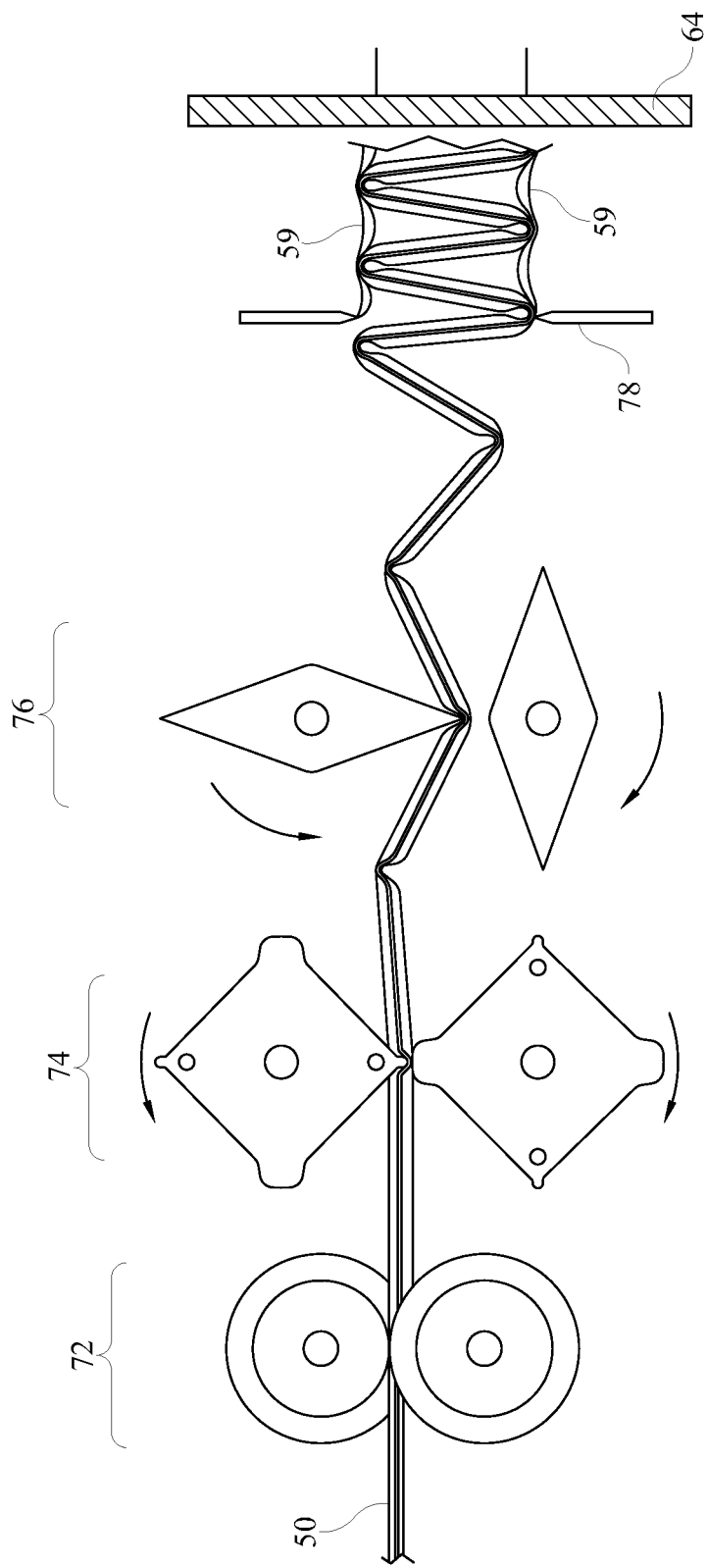
FIG. 7 is a side view of one embodiment for machinery which pleats various embodiments of the filter media described herein.

As shown in exemplary fashion in FIG. 7, the pressure rollers 72 may be combined with the scoring rollers 74 and pleating rollers 76 to properly form the plurality of pleats 62 described. A nozzle 78 may be provided as depicted to position a continuous line of separator material 59 on the tip portion of each pleat in order to maintain proper pleat separation. As indicated, separator material may be a clear poly-alpha olefin which does not leach colors or discolor the white filtering media when exposed to the PAO during the challenging process.

Figure 9:
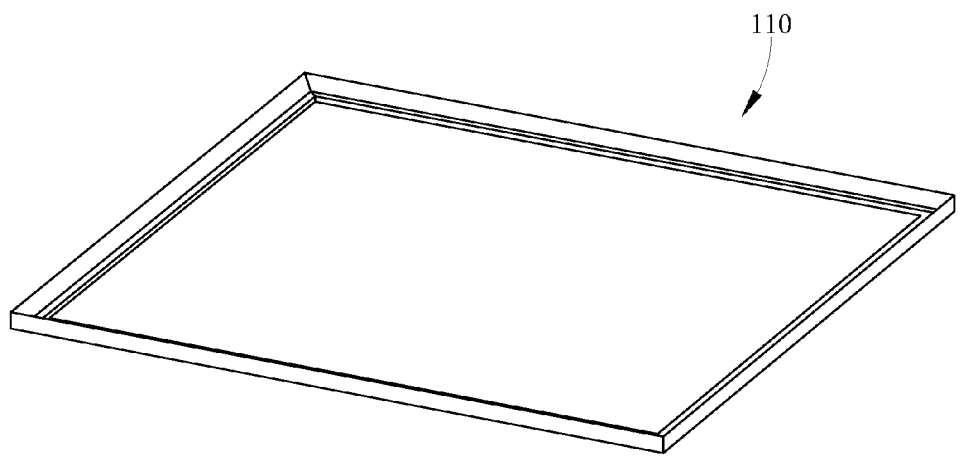

Once the media is properly pleated, it may be cut and prepared for insertion into a frame material 110 as shown in FIG. 9. The filter frame may be anodized extruded aluminum, for example. In some applications, the filter frame, whether utilizing aluminum or a viable alternative as are known, may form a continuous channel that is filled with a non-flowing gel. A skirt or edge 101 may be embedded into the gel sealant to effect a leak-proof seal between the filter install environment. Alternatively, a gasket seal system may be utilized wherein a flat flange on the downstream side of the filter frame is implemented. Other known frame structures and seals may be utilized in the various embodiments disclosed. Gel seals may also be utilized which, in various installations, may include an elastomeric.

Figure 8:
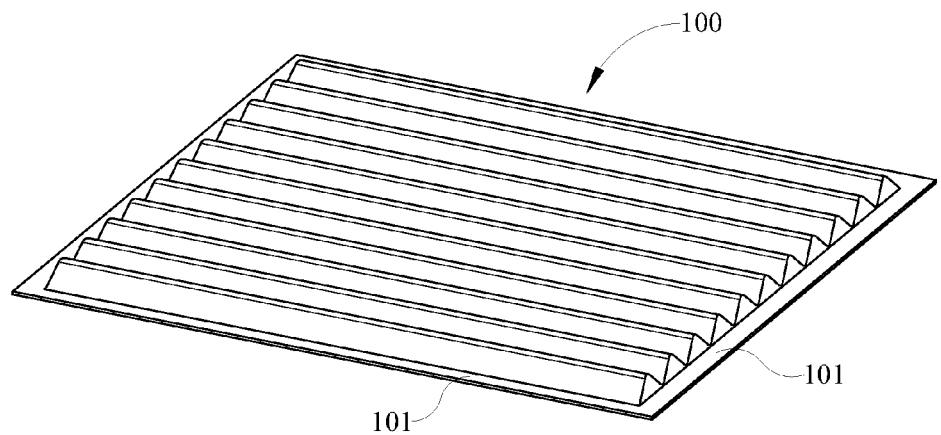
FIGS. 8 and 9 are perspective views of a pleated filter media prepared for insertion in a frame and a view of an exemplary frame for holding same.
Figure 10:
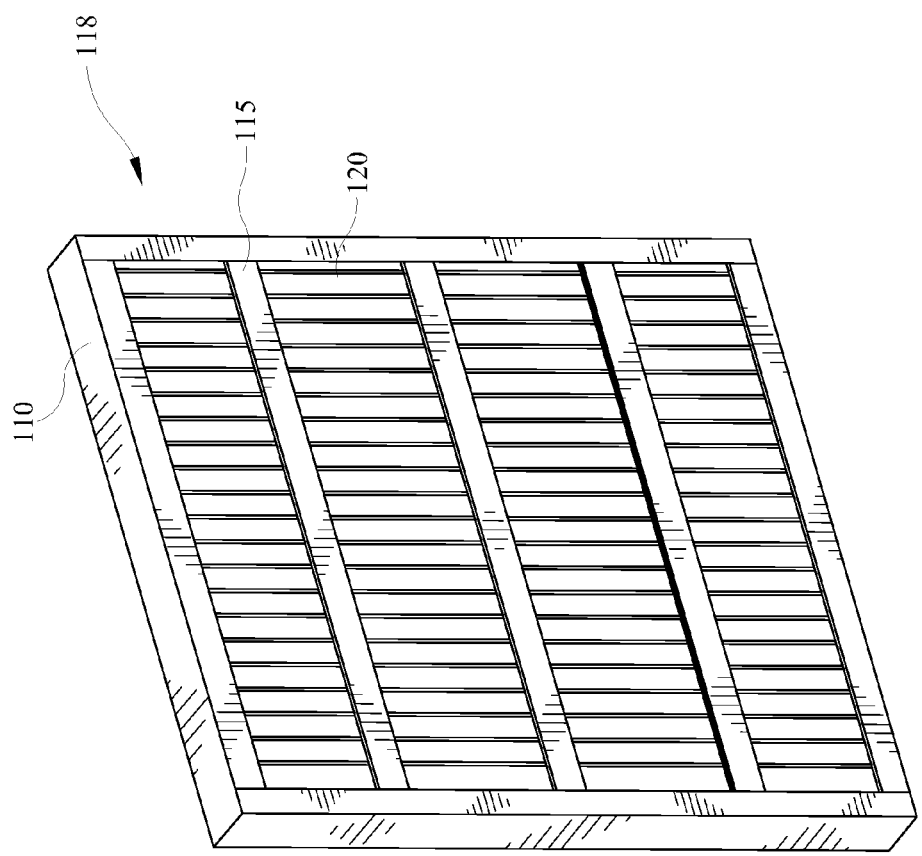
FIG. 10 is a perspective view of the assembled filtering media and frame combined for use according to one aspect of the present invention.

A single filter unit 100 is shown in FIG. 8 prior to insertion into a frame structure 110. Edges 101 may be crimped for retention within the frame structure, the entire filter retained within the structure by known method and structures available. FIG. 10 depicts an exemplary embodiment in which the completed filter 118 includes exemplary support strips 115 with a plurality of pleats 120 shown and properly supported by various separator structure as described.

After installation into an aseptic pharmaceutical facility, in place certification must be conducted. As discussed herein, such challenging often includes challenging with an oil based aerosol such as PAO in order to determine leak size and filter structural continuity. In combination with the ePTFE filtering media set forth, a process is provided for ultra-low concentration challenging of filtering media in an aseptic pharmaceutical environment. In general and in various embodiments described herein, one or more ePTFE filter embodiments described herein may be utilized in an ultra-low aerosol concentration challenging step wherein the upstream airflow is entrained with a challenging compound. In general and in various aspects set forth, PAO aerosol may be introduced upstream in order to determine damage to the filter or seal structure. Such normal and periodic leak determination and examination is required in such applications and through use of the ultra-low concentration methodology in combination with the ePTFE filter, filter life can be significantly enhanced up to and including the lifespan of the facility.

Figure 11:
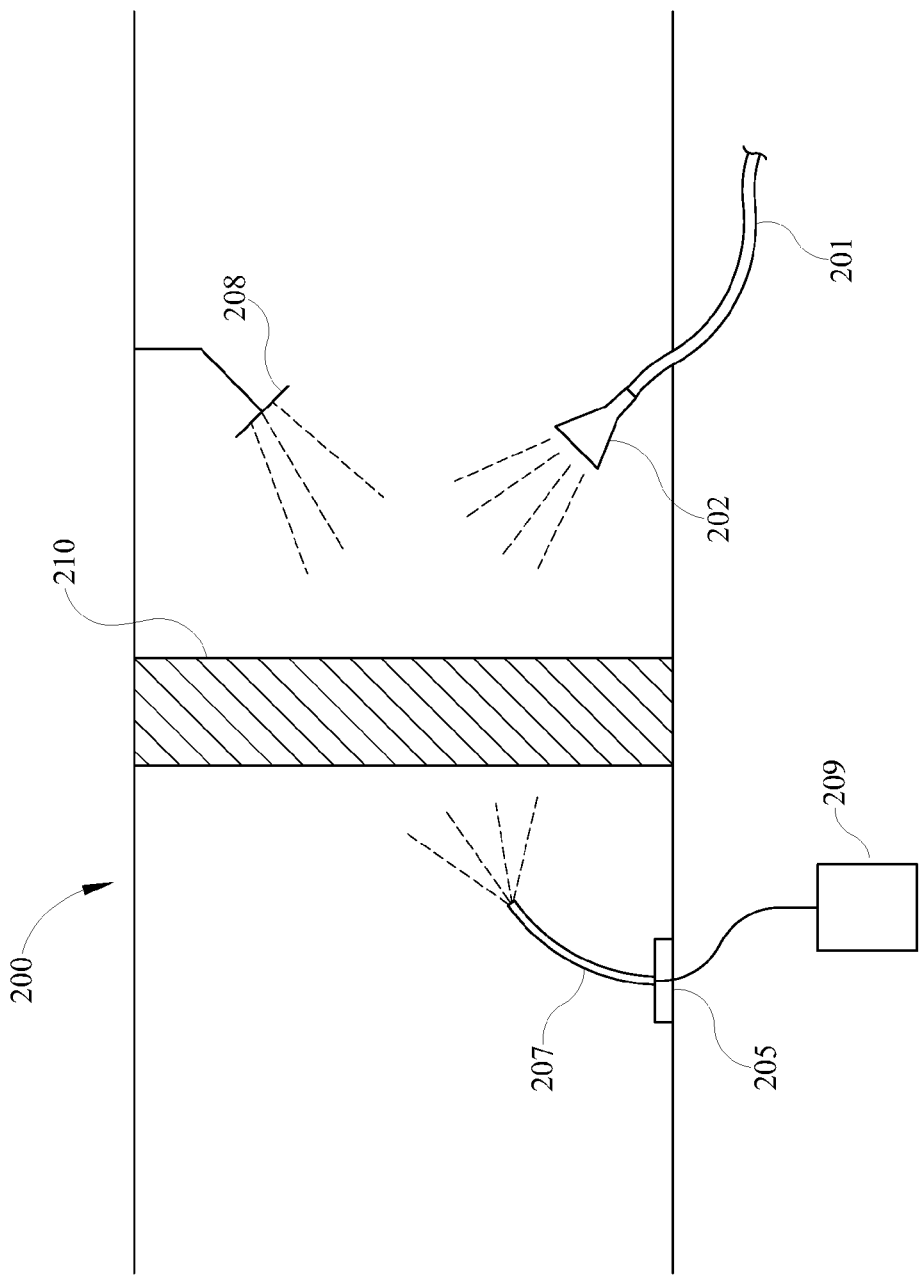
FIG. 11 is a side sectional view of a representative aseptic pharmaceutical installation using an ePTFE filter and a challenge configuration.

In general, and as is depicted by example only in FIG. 11, an ePTFE filter 210 is placed within an airstream within duct or other air conveyance system 200. During challenging of the ePTFE media, a source of ultra-low concentration of PAO or other aerosol is placed upstream of the filter 210. In this embodiment, a nozzle 202 having a supply 201 may be operational as a low or ultra-low volume emitter of challenging aerosol. In certifying such filters, leakage is determined by comparison of the challenge concentrations at both the upstream side versus the downstream side. If a leak or other structural imperfection in the filtering media and filter seal is present, downstream concentrations of greater than about 0.01% indicates such. Thus, upstream and downstream concentrations of the challenging material must be determined, and a concentration or leak size calculated.

In some of the embodiments discussed, a challenging material such as PAO aerosol may be utilized. As a result of installing a HEPA ePTFE filtering media in one example, ultra-low concentrations of the PAO may be introduced using an aerosol generator and measured using a particle counter/aerosol diluter combination, as depicted for exemplary purposes in FIG. 13. These low and ultra-low concentrations are suggested to range between about 1.0 µg/L down to about 0.01 µg/L. Such small concentrations on the downstream side of an ePTFE filtering media require discrete measurements of particles. Thus, a discrete particle counter 209 may be utilized to accurately measure such ultra-low concentrations of the challenging material. As shown, a particle counter 209 may be combined with a hand scan probe or other discrete measurement device 207 which can be fed into the downstream airflow adjacent to the downstream side of the filter 210 via an access port 205 to take appropriate measurements.

Downstream concentration measurements by the particle counter 209 may be compared to upstream concentrations calculated by the upstream scanner 208 in order to determine PAO penetration concentrations. As indicated, downstream concentrations of greater than about 0.01% of upstream concentrations would indicate filter integrity issues. And, as a result of embodiments using a HEPA ePTFE media, only ultra-low concentrations of the challenging PAO aerosol can be utilized in order to avoid fouling the media or otherwise resulting in a significant drop in efficiency and filtration capability. As such, specialized ultra-low concentration measuring protocols and equipment must be utilized to determine downstream concentrations and leakage percentage.

As stated herein, an important feature of an aerosol generation system is the ability to provide a source of aerosol challenge applied to a filter media for testing wherein the aerosol comprises droplets that do not agglomerate or coalesce to form larger particles that can create an undesirable pressure drop across the filter media or excessive oiling of the filter media. One method of preventing excessive oiling is to reduce the generator output by decreasing the nozzle pressure or air flow through the nozzle. However, doing so ultimately results in less generator output flow, which may be undesirable, and can also slow down generator response time upon startup or output adjustment.

In one aspect of the present invention, an aerosol generation system is provided which increases output flow of the generator without excessive oiling by adding additional supply air (bypass or secondary air) to the generator. In general, adding bypass air is intended to perform three main functions: (1) to increase the total generator output flow; (2) to prevent newly generated aerosol from remaining in the holding tank for an extended period of time; and (3) to dilute the generated aerosol. Exemplary methods to increase the output flow using bypass air are shown in FIGS. 17-20.

Figure 17:
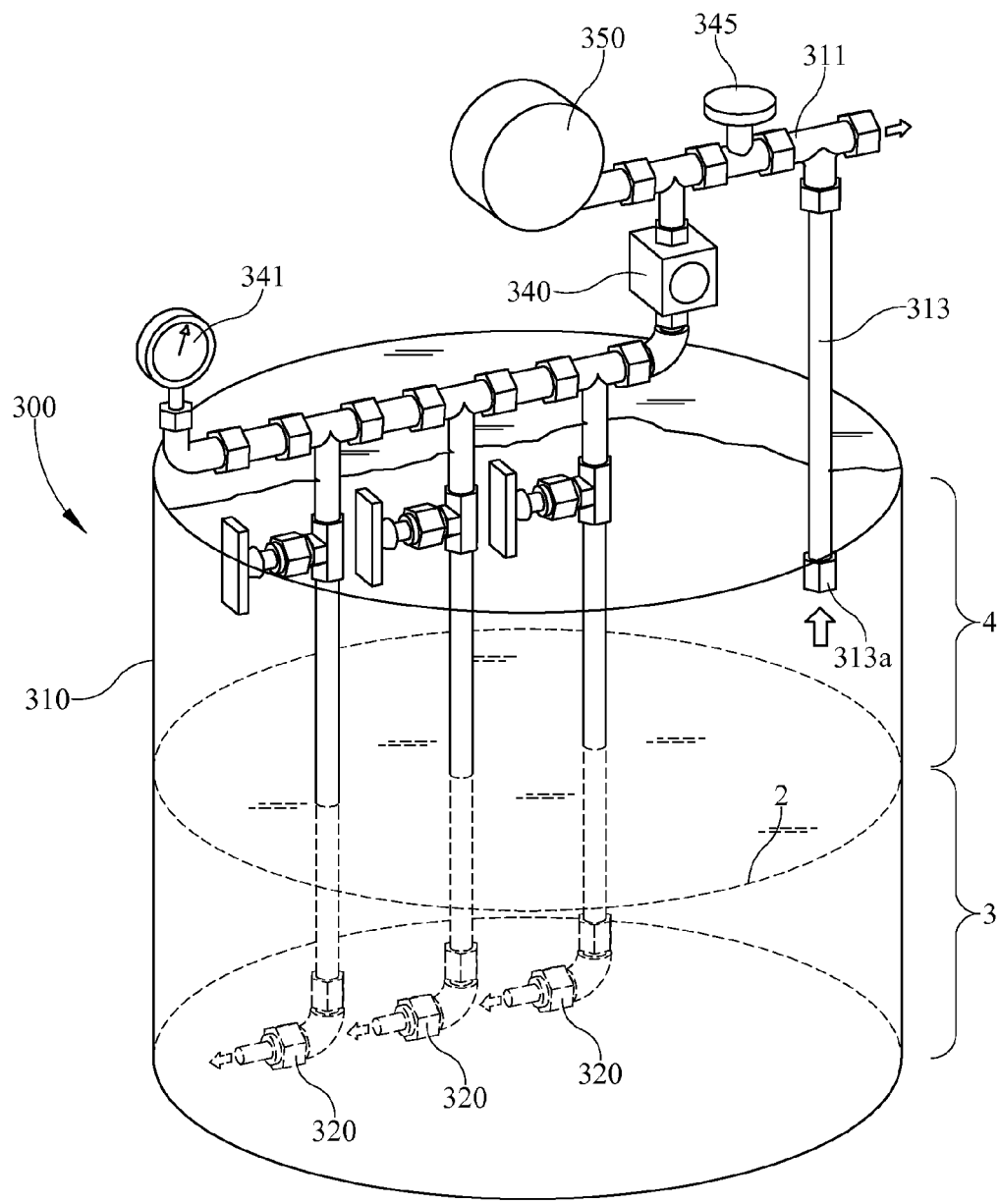
FIG. 17 is a schematic of an embodiment of an aerosol generator having bypass air added at the tank outlet.

FIG. 17 depicts an embodiment wherein additional bypass air is added to the generation system at the generator output or outside the reservoir or holding tank. As illustrated, the aerosol generator 300 may include the liquid holding tank 310 with pump 350, needle valve 345, and regulator 340 in fluid communication with one or more generation outlets or nozzles 320, such as but not limited to capillary nozzles. Air from the pump 350 sets the pressure at the regulator 340 with the needle valve 345, when open having a low pressure and when closed having a high pressure. The regulator 340 sets and maintains the pressure, viewed with the pressure gauge 341, on the nozzles 320. The generation nozzles 320 are positioned below the surface 2 of the liquid 3. The inlet 313a to the generator outlet 313 is positioned above the liquid surface 2 in a void space or non-liquid section 4 of the holding tank 310. In this embodiment, the output or aerosol generated passing through the generator outlet 313 combines with the additional bypass air bypassing through the needle valve 345 away from the pump through a bypass air supply 311 outside the holding tank 310.

Figure 18:
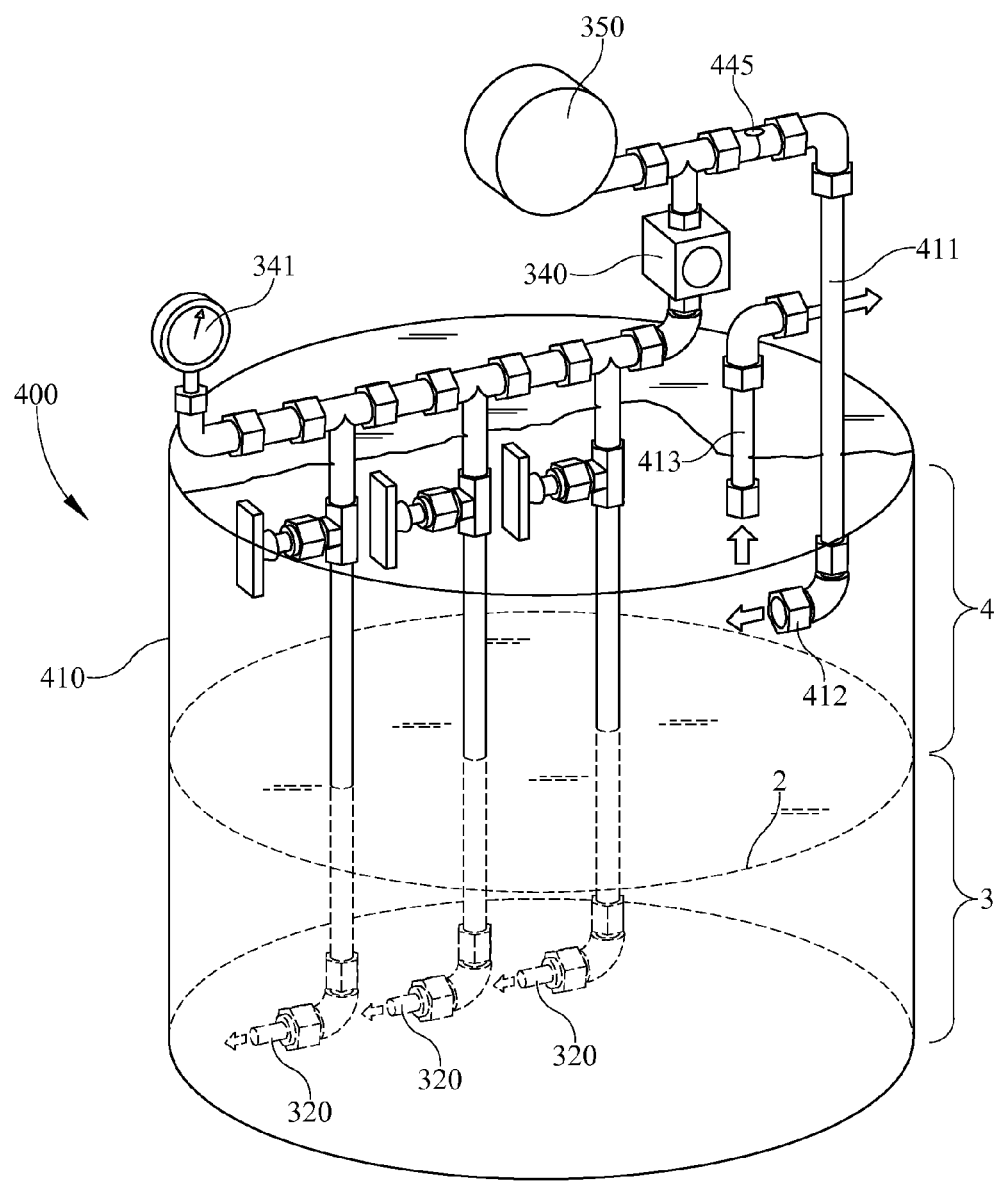
FIG. 18 is a schematic of an embodiment of an aerosol generator having bypass air added to the holding tank above the liquid surface.

FIG. 18 depicts an embodiment of an aerosol generator 400 wherein the bypass air is added to the generator holding tank 410 above the liquid surface 2. The bypass air enters the liquid holding tank 410 above the liquid level or surface 2 in the void space 4 through the air inlet or bypass nozzle 412 of the bypass air supply 411, wherein the aerosol and bypass air mixes within the holding tank 410 before outlet discharge through the generation outlet 413. Also instead of the needle valve 345 as shown in FIG. 17, an orifice 445 is in fluid communication with the bypass air supply 411 and pump 350 to create back pressure. However, it should be understood that a needle valve or regulator could be used as well to control the bypass air flow and/or air inlet pressure.

Figure 19:
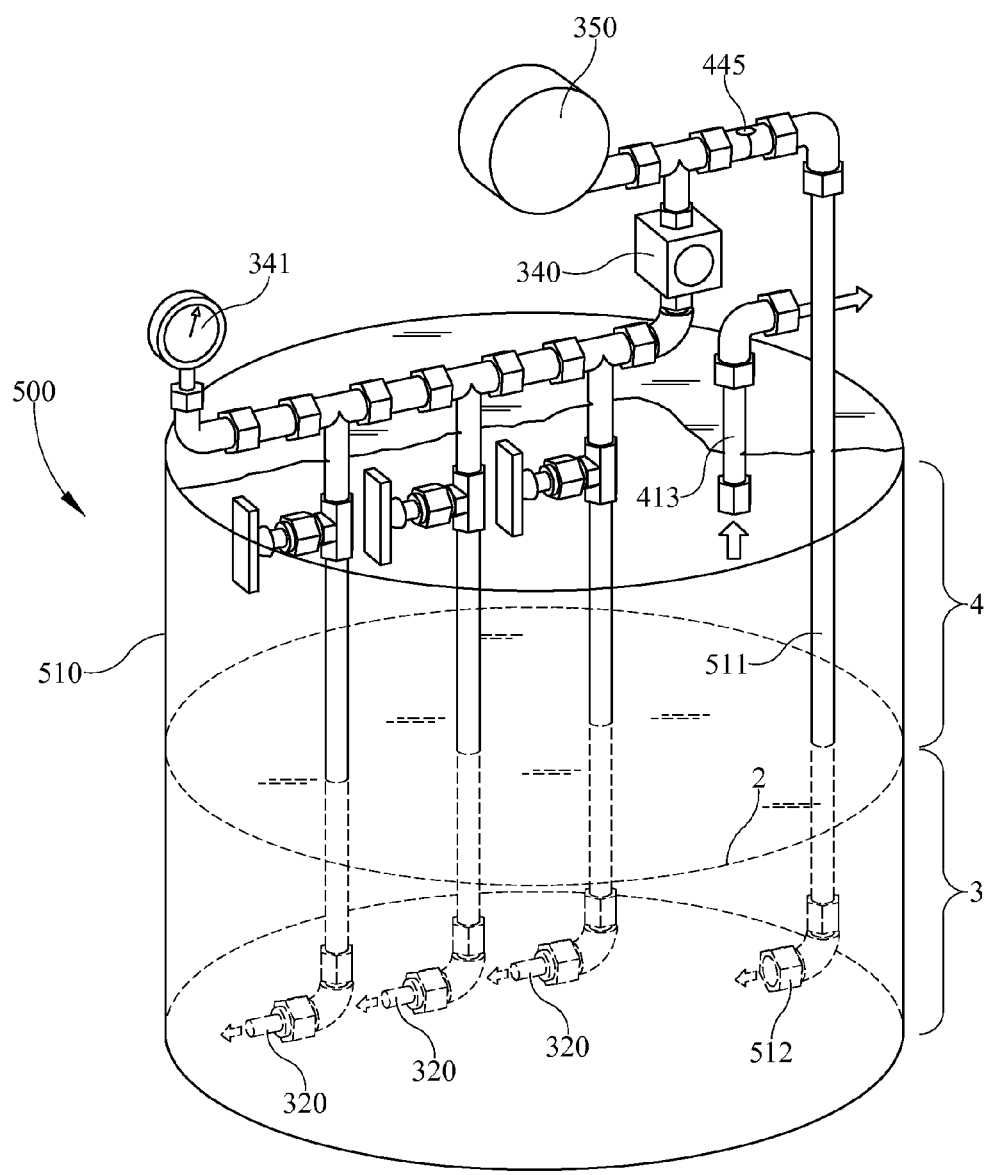
FIG. 19 is a schematic of an embodiment of an aerosol generator having bypass air added to the holding tank below the liquid surface.

FIG. 19 depicts another embodiment of an aerosol generator 500 wherein the bypass air is added to the generator holding tank 510 below the liquid surface 2. Similar to the embodiment of FIG. 18, the bypass air supply 511 introduces the bypass air within the liquid holding tank 510, however, the air inlet 512 to the bypass air supply 511 is positioned below the liquid surface 2.

Figure 20:
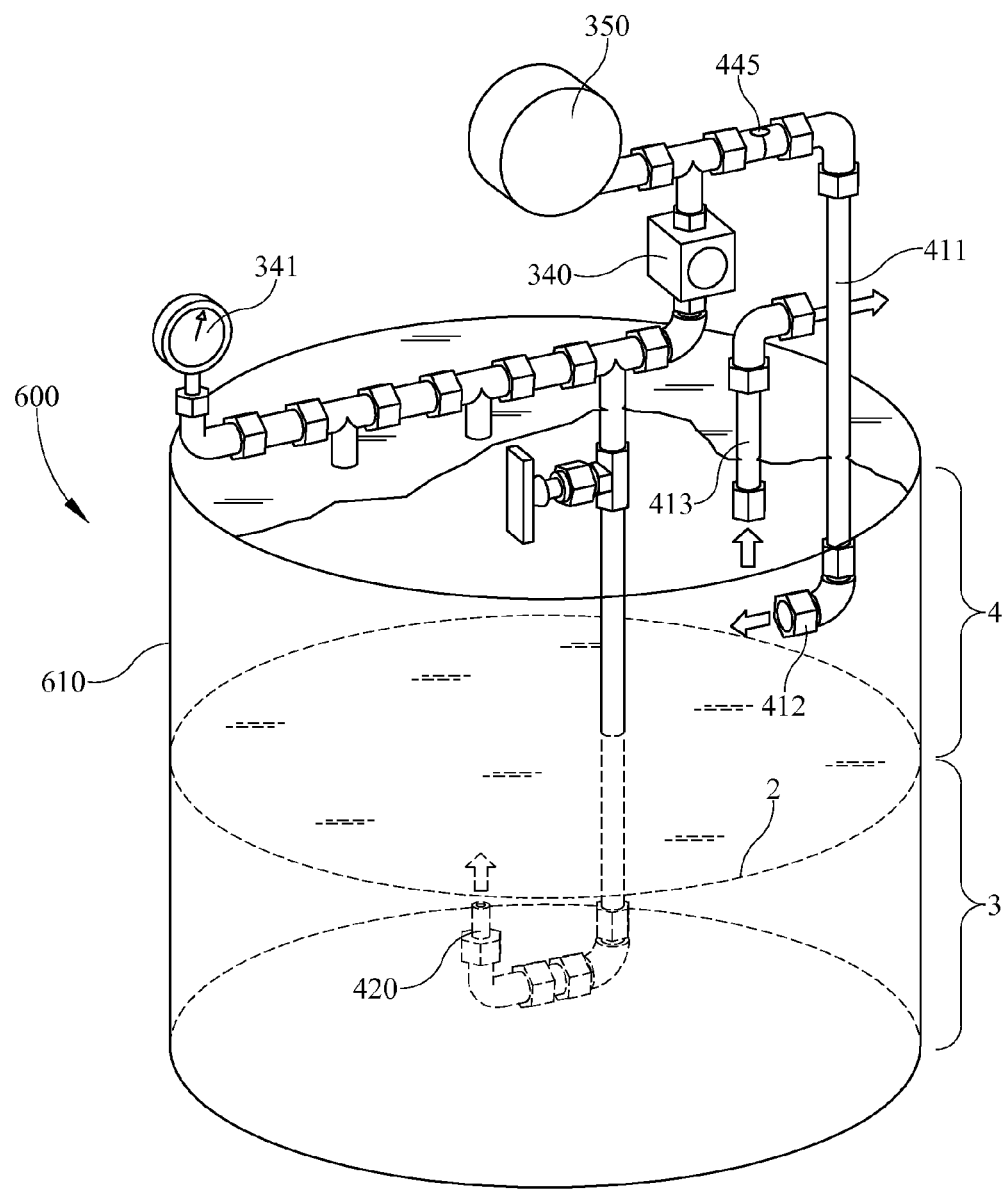
FIG. 20 is a schematic of an embodiment of an aerosol generator having bypass air added to the holding tank above the liquid surface and generation air added in a direction perpendicular to the liquid surface.

FIG. 20 depicts an embodiment of another aerosol generator 600 wherein the bypass air is added to the generator holding tank 610 above the liquid surface 2 similar to FIG. 18, but the generation nozzle 420 is directed perpendicular to the liquid surface 2. Although not shown, it should be understood that the bypass air may be introduced below the liquid surface 2. The generation nozzle 420 is directed in a substantially vertical orientation towards the liquid surface 2 as compared to a horizontal or parallel direction to the liquid surface 2 as shown in FIGS. 17-19. By dispersing the air substantially vertical as shown within the liquid 3, the aerosol and bubbles may quickly reach the liquid surface 2 or void space 4 within the holding tank 610. Limiting the time to remove the aerosol may reduce the opportunity for smaller particles from combining to create larger particles. It should be understood to one skilled in the art that the generation nozzles may be of a variety of quantities, constructions, pressures, orientations and positions relative to, but not limited to, within the holding tank, bypass air inlets, and liquid surface. For instance, one or more generation nozzles may be a variety of distances from the bypass air inlets in any direction, whether the bypass air inlets are below or above the liquid surface, within the holding tank. Nozzle orientations also can affect generator output and overall performance characteristics. In general, newly generated aerosols should exit areas of high challenge liquid concentration (i.e., the holding tank) rapidly. This tends to reduce the rate of particle size growth of the droplets.

Further, although the embodiments illustrate several distinct positions of the inlets of the bypass air supply introducing or supplying bypass air into the generator it should be understood that the bypass air supply may be positioned within the tank, above the liquid level within the tank, below the liquid level within the tank, outside the tank, or any combination thereof. As such, the bypass air supply and inlets may be of a variety of positions, quantities, orientations, sources such as but not limited to the same or different from the generation air supply, and constructions and still introduce bypass air. Further, the duration and amount of pressure of such bypass air may be varied.

The addition of the bypass air to the holding tank above the liquid surface enables the newly generated aerosol to be mixed within the tank and allows the newly formed aerosol to exit the tank rapidly. This has an advantage over adding the bypass air at the generator output as the mixing at the generator output may be less uniform. Adding bypass air to the holding tank below the surface of the liquid (away from the nozzle) achieves a similar result to adding the bypass air above the liquid surface. It should be noted, however, that PAO turbulence in close proximity to the nozzle outlet may increase aerosol output. As such, the amount of agitation may be adjusted by the distance between the generation nozzle and introduction of bypass air beneath the liquid surface.

Figure 21:
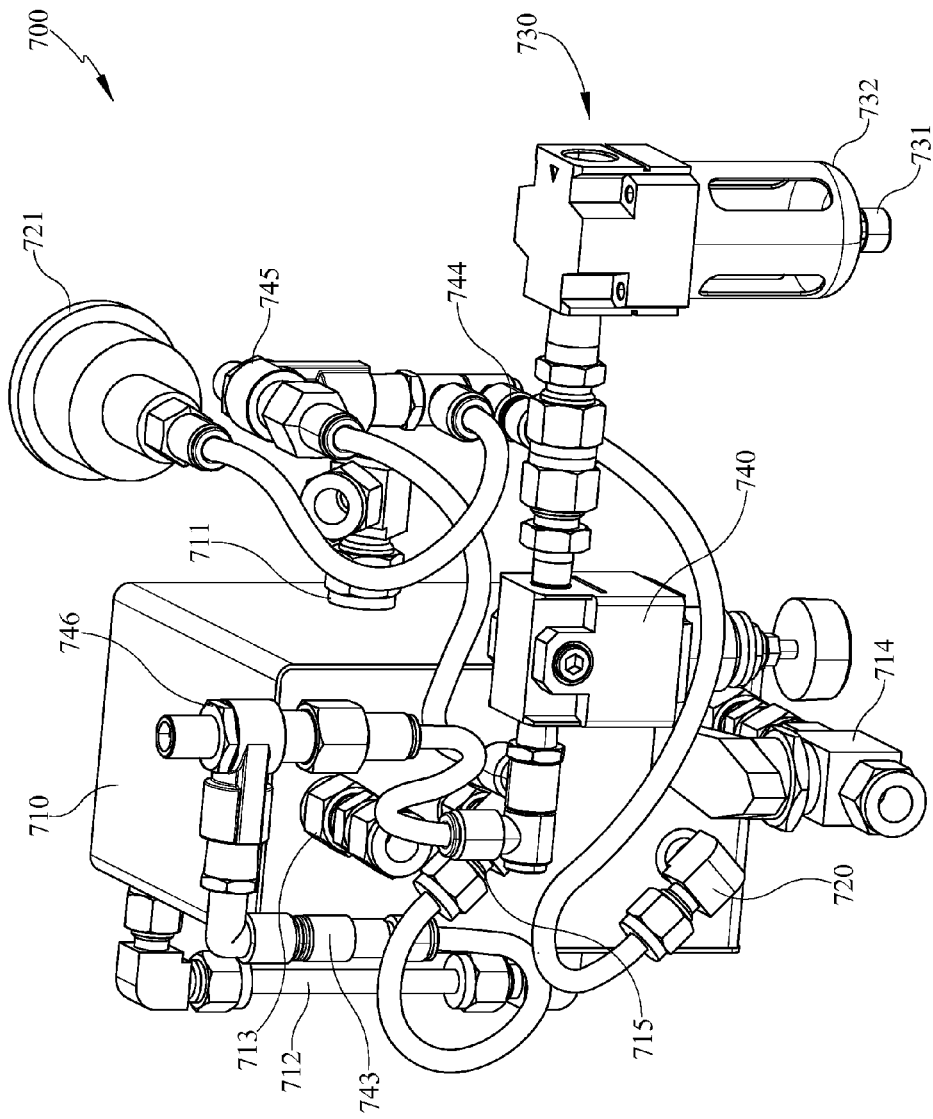
FIG. 21 is a perspective view of an exemplary embodiment of a generator according to one aspect of the invention.
Figure 22:
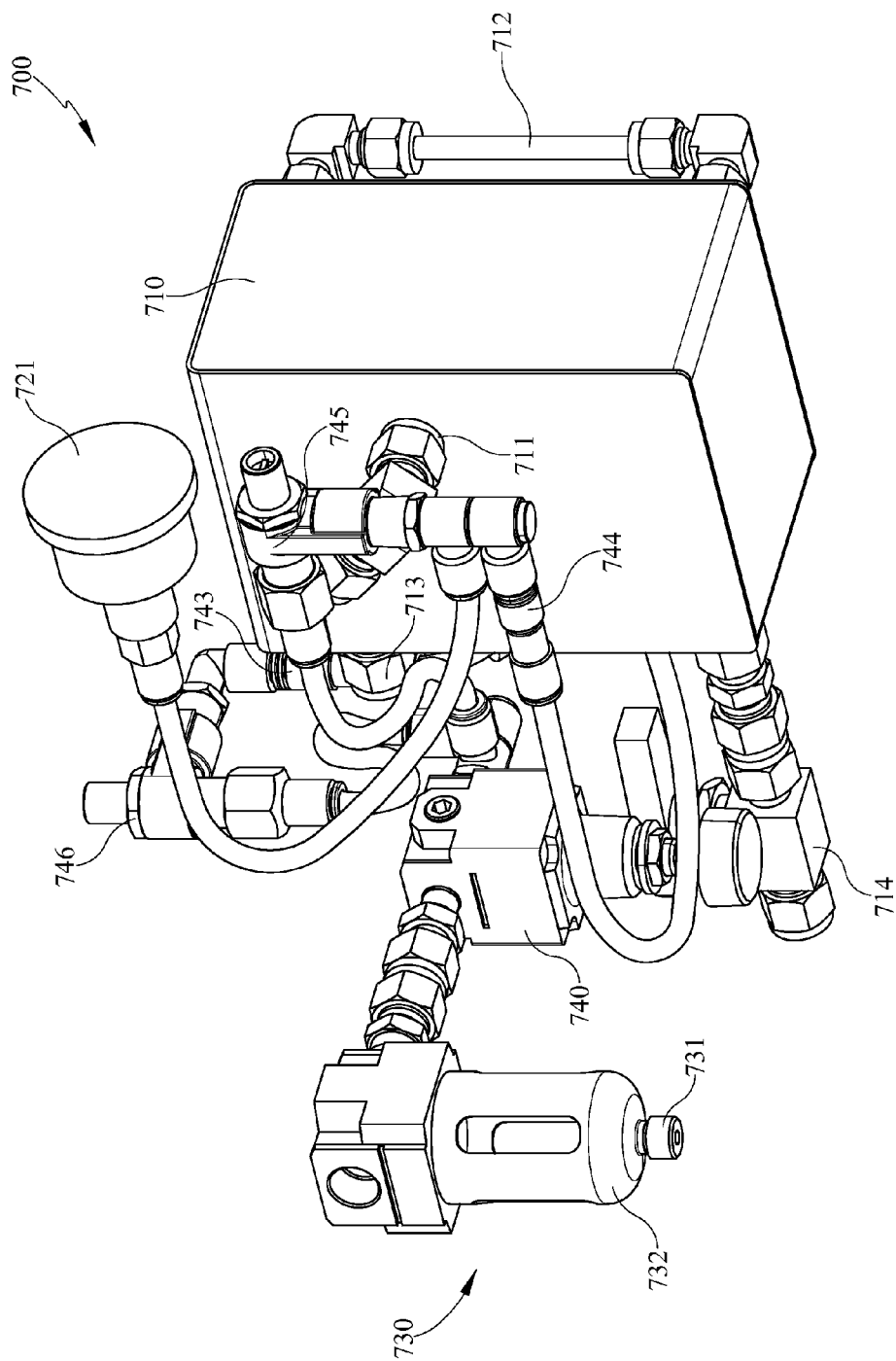
FIG. 22 is another perspective view of the embodiment shown in FIG. 21.

Referring now to FIGS. 21 and 22, an embodiment of an aerosol generator 700 is shown. A reservoir tank 710 is provided for the liquid of choice to be used in the generator 700. The tank 710 has a fill port 711 for connection to a source of liquid for adding to the tank 710. The tank 710 also has a generation nozzle 720 through a sidewall of the tank 710. The tank 710 is filled with the liquid to be atomized through the fill port 711 so that the generation nozzle 720 is submerged below the liquid surface. During operation the fill port 711 is sealed to prevent the escape of aerosol through the port. The tank 710 also has a liquid level indicator 712 for providing visual cues to an observer for indicating the amount or level of liquid within the tank 710 and when the liquid level begins to fall close to the generation nozzle 720 or when the liquid level is too high. The tank 710 also has a tank outlet 713 through which aerosol is expelled, as will be described below, and a drain valve or opening 714 for draining and/or cleaning the contents of the tank 710. In the embodiment shown in FIGS. 21 and 22, the tank 710 further contains a bypass air inlet 715 through the tank 710 sidewall at a height sufficient to be located generally above an upper surface of the liquid within the tank 710 during normal operation. The bypass air inlet 715 provides the opening through which bypass air is supplied to the tank 710 to assist in increasing aerosol output flow.

Compressed air (source not visible in the figures) may pass through a mist separator 730. The mist separator 730 filters particulate matter and some water within the air that enters the generator 700. If "dirty" air enters the system without using a mist separator, particulate matter can potentially clog various elements in the system. Larger filtered compressed air systems may adequately dry the air without a need for a mist separator. If a mist separator is used, water will collect in the mist separator 730 and can be drained off through a drain 731 in the bottom of the collection bowl 732. After passing through the mist separator 730, the compressed air enters a regulator 740. The regulator 740 is preferably a precision regulator that is better able to maintain the downstream pressure than some standard regulators. However, a standard regulator may be used. In order for the generator 700 to produce a stable output, it is important to maintain a stable downstream pressure. The regulator 740 typically supplies a determined pressure of air (in the embodiment shown, approximately 30 psi) to two speed control valves 745, 746. The speed control valves 745, 746 are essentially needle valves that restrict the flow of air. By using two valves 745, 746, the amount of air entering the bypass air inlet 715 and the air entering the generation nozzle 720, and the corresponding pressure at the generation nozzle 720, can be independently controlled. This assumes there is an unlimited supply of air being provided by the compressed air source and that the regulator 740 is able to deliver the air at the determined pressure. The pressure is monitored at the generation nozzle inlet by a pressure gauge 721. The typical operation pressures range from approximately 2 psi to 20 psi. Increasing the pressure on the generation nozzle 720 increases the amount of air flow through the nozzle 720, which increases the amount of particles generated by the nozzle 720.

A check valve 743, 744 is placed after each of the speed control valves 745, 746, respectively. The purpose of the check valves 743, 744 is, in typical fashion, to prevent oil or fluid backflow into the system. The air passing through the generation nozzle 720, the liquid particles being generated by the nozzle 720 and the bypass air will mix within the tank 710 and exit the tank 710 through the single outlet 713. The bypass air will create some air turbulence inside the tank 710 mixing the aerosol with the additional air supplied to the tank. The bypass air will also serve as a carrier, sweeping the newly generated particles out of the tank 710 more rapidly than if there were no bypass air.

There are two standard ways to increase particle generation through the nozzle. One is to provide more pressure to the nozzle and the other is to increase the diameter of the nozzle opening.

Referring again to FIG. 11, as indicated above, it is significantly desirable to use the various embodiments of filtering media disclosed herein as compared to traditional microglass. As a result, such methodology using ultra-low concentration aerosol generators must be used in combination with detection equipment capable of measuring such concentrations at both the upstream and downstream side of the media 210. An upstream scanner 208 may be combined with the downstream scanner 209 as shown. Automated systems including a microprocessor and software may be utilized to read the measurements of the two scanning devices in order to quickly and accurately determine downstream concentrations. Such microprocessor may be incorporated with the upstream scanner, downstream scanner, or in some embodiments, may combine both structures and functionality to calculate the downstream leakage percentage. Alternatively, in other embodiments, downstream measurements may be made and determinations of downstream ultra-low concentrations then determined.

Upstream concentrations, even when at ultra-low values as specified herein, may be so large that an upstream discrete particle counter may be overwhelmed. Thus, in some embodiments, a combination of an upstream photometric scanner with a downstream discrete particle counter may be utilized in order to calculate the appropriate downstream penetration percentage concentration of the challenging aerosol. In general, an upstream aerosol photometer with an associated sampling or scanning head 208 may be used to determine ultra-low upstream concentrations. Associated with the upstream aerosol photometer and scanning head 208 may be a modified Laskin nozzle 202 which generates the ultra-low concentrations of the challenge PAO for the filter test and certification. Such Laskin nozzle generator may be used in combination with an aerosol reducer. The modified Laskin aerosol generator may be modified such that finite control and output of the challenge PAO concentrations may be maintained at such low concentrations as to not substantially affect the efficiency and effectiveness of the HEPA ePTFE filtration media 210 depicted. Such concentrations include controllable emissions of from about 1.0 µg/L down to about 0.01 µg PAO/L or lower which may include determination of concentrations down to about 0.1 µm/cubic foot or about 6 million particles per cubic foot or lower. Of course, the upstream detector 208 may be any type of ultra-low concentration detectors capable of accurately measuring the PAO concentrations on the upstream airflow and filter face such that an accurate calculation of the downstream concentration percentage may be made.

Associated with the modified Laskin nozzle 202 and aerosol reducer and upstream detector 208 is a downstream detector which must be capable of measurements as low as 0.01% of the ultra-low upstream concentrations. Thus, an exemplary laser particle counter 209 with a rectangular hand scan probe, as one example embodiment, may be utilized in order to scan the filter corners and having a 0.3 µm particles or smaller minimum detectable size and concentration and a rectangular hand scan probe to fulfill near isokinetic flow conditions.

For example, in some embodiments, a flow-thru system with sheath flow, multi-LED and/or laser diode for excitation may be used. Such associated electronics will utilize scattering for detection and should be capable for detection of particle sizes down to 0.1 µm and mass concentration of about 1 µg/L down to 0.01 µg/L or lower for use of a photodiode or discrete particle detector. Further, for very low concentrations, near particle counter detection may be utilized with mass aerosol at a minimum of 0.1 µm and larger (i.e. particle counter/photometer with the capability to measure the penetration of 0.01% when the upstream concentration is 0.01 µg/L and greater). As indicated, a processor may be integrated into the interfacing for auto-calculating particle counting into penetration of the filtering media to determine leakage.

Once known upstream and downstream concentrations are calculated, a leak rate calculation may be completed wherein the downstream concentration is divided into the upstream concentration to determine the leakage rate. Calculations as low as a value equal to or greater than 0.01% challenge concentrations downstream would indicate a leak within the filter or seal structure. Automated leak calculation may be implemented by electronically connecting the upstream scanner 208 and the downstream scanner 209 such that leakage rates which compare the two scans may be determined. Such electronic connection may be standard communication lines between the devices, electronic communication lines between a centralized computer which reads the data from each device and provides automated leakage calculation, or an integrated scanning device which is capable of interconnected upstream and downstream measurements and which, after a specified exposure time period, calculates the appropriate downstream concentrations and the leakage values.

Exemplars

An exemplary measurement test was conducted on the effects of ultra low (<0.3 mg/m3 (µg/L)) PAO concentration testing of ePTFE filters was performed. The study showed the equivalence and effectiveness of testing ePTFE filters with industry typical concentrations (10 mg/m3 (µg/L) or greater) and ultra low concentrations of PAO to detect leaks and determine their sizes.

The conventional test method of using a photometer and a ≥10 mg/m3 (µg/L) PAO challenge was employed as a means to size defects created in an ePTFE filter. The results were directly compared to an alternative test method that was composed of using a discrete particle counter (DPC) with ultra-low reduced (<0.3 mg/m3 (µg/L)) PAO challenge concentrations. Testing was performed by creating twelve defects in a HEPA filter of a LFH (Laminar Flow Hood). Comparative test data was then taken using the two methods. The testing construction is shown in FIG. 13.

An X-Y axis linear bearing sample probe positioning device was placed in front of the LFH as a means to remove sampling variation due to probe positioning. This unit consisted of a base secured on the floor, with movable horizontal and vertical axes for exact probe positioning.

Figure 13:
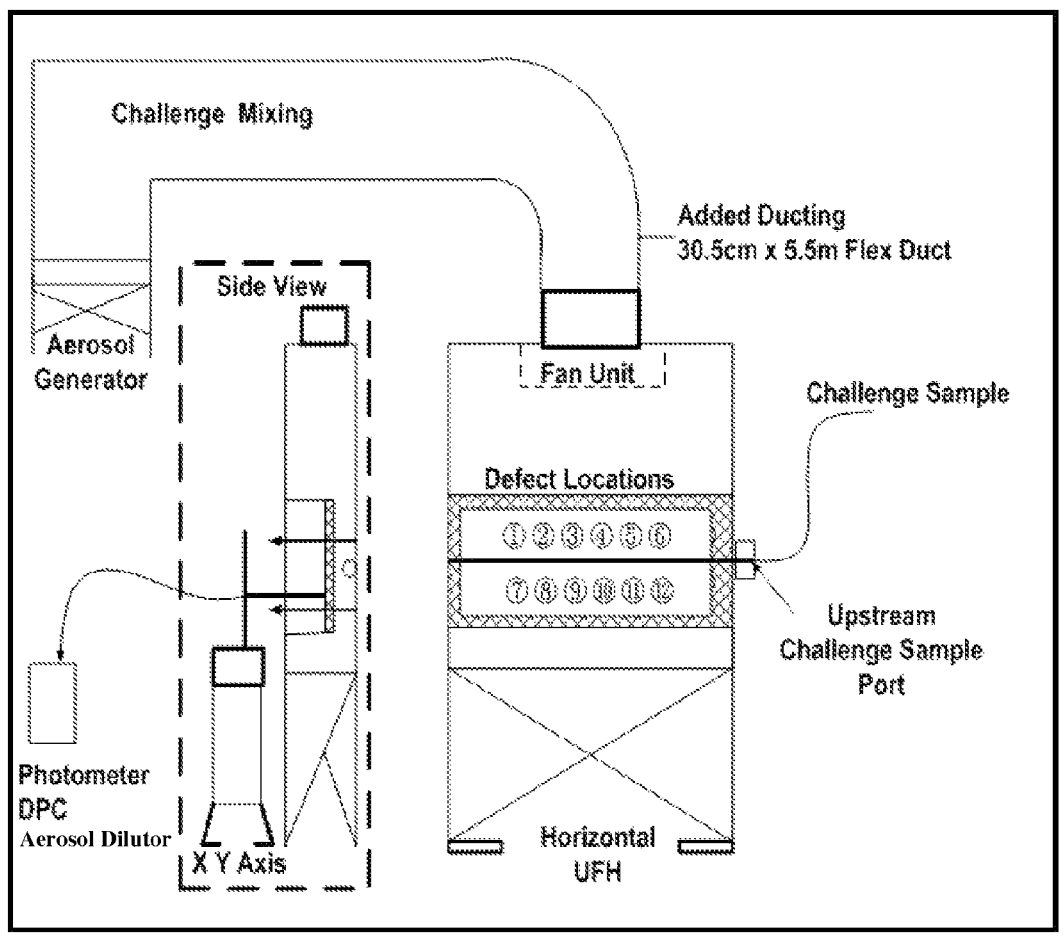
FIG. 13 is a schematic for a testing machine for determination of ultra-low concentrations of challenging aerosol using the system and method of the present invention.

The exemplar was performed using a 610 mm×1220 mm (2 ft×4 ft) horizontal LFH as shown and depicted in FIG. 13. A HEPA filter used for the study was an ePTFE filter as disclosed herein rated for a nominal flow of 630 cfm with an efficiency rating of 99.95% at the MPPS (Most Penetrating Particle Size). The LFH was tested for airflow velocity, leaks, and unidirectional flow prior to beginning the study. Determination of the uniformity of the aerosol challenge was accomplished by fabricating and installing a stainless steel guide upstream of the filter. A sampling tube was then inserted into the guide and positioned so the sample tube opening was located at the end of the guide. A flex duct was attached (30.5 cm (12 in.) diameter×5.5 m (18 ft)) to the inlet of the hood to achieve adequate upstream mixing.

Measurement and test equipment utilized to determine aerosol challenge concentrations upstream of the testing ePTFE HEPA filter was a TSI 2-G photometer and a Lighthouse Solair model 3100 laser particle counter in combination with a Milholland & Associates model 450ADS aerosol diluter as listed in Table 1 below. The particle counter and diluter instrument combination was used to determine the actual number of challenge particles for ultra low level PAO testing (<0.3 mg/m3 (µg/L)) which corresponds to conditions 1 and 2 set forth in Table 1.

Study Conditions

The equipment and materials utilized in this sample test included the following: Discrete Particle Counter; Portable Self-Contained Aerosol Generator; Poly-alpha-olefin (PAO); Photometer; 2'×4' Horizontal Laminar Flow Hood; Aerosol Dilutor; X-Y Axis Positioning Device; 12"×18' Flexible Ducting; Air Data Multimeter; Handheld Ultrasonic Aneometer.

Three evaluated conditions were derived from a combination of the particle sizes (0.3 and 0.5 µm), photometer and DPC test equipment, and the selected aerosol challenge concentrations (PAO). The following Table 1 defines the test instruments, concentrations, and particle sizes tested. A PAO aerosol produced by a Laskin nozzle of 38 million particles >0.3 µm is equivalent to approximately 0.2 mg/m3 (µg/L).

TABLE 1

| Method | Condition | Instrument | Reported Challenge Measurements |
|---|---|---|---|
| Ultra Low PAO | 1 | Discrete Particle Counter | ~20 × $10^6$ ≥ 0.3 µm particles per $ft^3$ PAO |
|  | 2 | Discrete Particle Counter | ~7 × $10^6$ ≥ 0.5 µm particles per $ft^3$ PAO |
| Standard PAO | 3 | Aerosol Photometer | >11 mg/$m^3$ (µg/L) |

Defects consisting of twelve holes were made in the ePTFE media by inserting a 30 gauge hypodermic needle into the media twice at each defect site. The average face velocity of 104 fpm (0.528 msec) was determined using the ultrasonic anemometer. The face area of the filter was 6.52 ft2. The volumetric flow through the filter was calculated to be 675 cfm. Pressure drop across the filter was measured to be 0.158" wc. It was noted this was approximately 25% of the pressure drop of a comparable wet-laid microglass filter (0.58" wc @650 cfm) operating at 90% of the airflow volume of ePTFE.

Upstream mixing was verified using a particle counter with ultra low concentrations of PAO as the challenge. Measurements were taken at six locations upstream of the ePTFE filter. The sample locations fell in between the two rows where the defects were created, that being approximately four inches below and above the first and second rows respectively. The PAO sample reading variance for the six locations was less than about 1%.

TABLE 2

Upstream particle counts at leak detection points

| Sample Location | counts/$ft^3$ ≥0.3 micron particles | counts/$ft^3$ ≥0.5 micron particles |
|---|---|---|
| 1 | 37890 | 11224 |
| 2 | 39732 | 12038 |
| 3 | 39726 | 12018 |
| 4 | 39484 | 11868 |
| 5 | 39624 | 12114 |
| 6 | 38626 | 11810 |

A quarter-sized Laskin nozzle generator was used in combination with an aerosol reducer (oil mist eliminator with an 18 gauge capillary bypass) to provide the upstream challenge. Thirty-second samples (0.5 $ft^3$) were taken at each of the six locations and the counts per cubic foot are shown above. The differential pressure of the dilutor was measured at 4.89" wc which corresponded to a dilution factor of 966. The Laskin nozzle generator with the aerosol reducer created a filter challenge of approximately 20 million particles at ≥0.3 µm and approximately 7 million particles at ≥0.5 micron per cubic foot of air. The sizing was repeated 10 times to gain statistical significance.

Ultra Low PAO <0.3 mg/m3 (µg/L) Challenge Using a Discrete Particle Counter (Conditions 1 and 2)

The ePTFE Filter was challenged with an ultra low level of PAO in the range of 0.3 mg/m3 (µg/L), as determined by the photometer. The defect sizes were measured in order starting with defect 1 and continuing sequentially to defect 12. After completing the defect sizing, a new upstream challenge was measured and defect sizing was repeated for a total of 10 runs to give statistically valid numbers.

At the beginning and end of each run the upstream challenge was recorded. At the end of run 8 it was noted that the upstream challenge was increasing at a significant rate. It was theorized that the increase was related to loading of the oil mist eliminator used to reduce the output of the aerosol generator. Runs 9 and 10 were excluded in the analysis due to the abruptly rising challenge concentrations.

Standard PAO 10.0 mg/m3 (µg/L) Challenge Using an Aerosol Photometer (Condition 3)

The third condition consisted of utilizing the traditional PAO aerosol/photometer method to size the defects created in the ePTFE filter. The ePTFE filter was challenged with approximately 10.7 mg/m3 (µg/L) (average upstream of 10 runs) of PAO using a TEC 1.5 Laskin nozzle generator operating at 20 psi. The defect sizes were measured with a photometer in order starting with defect #1 and continuing sequentially to defect #12. After completing sizing for all 12 defects, a new upstream challenge was measured and defect sizing was repeated for a total of 10 runs. The average (over 10 runs) defect size is shown below for each defect 1-12.

SUMMARY

The performance of the ePTFE was unaffected during testing. The data showed that the ePTFE filter was unaffected by the testing as it maintained efficiency of at least 99.99% and a pressure drop of 0.1578" H2O. This is compared to a capture efficiency of 99.99% and a 0.6" H2O pressure drop across the glass filter at 90% of the airflow.

Figure 16:
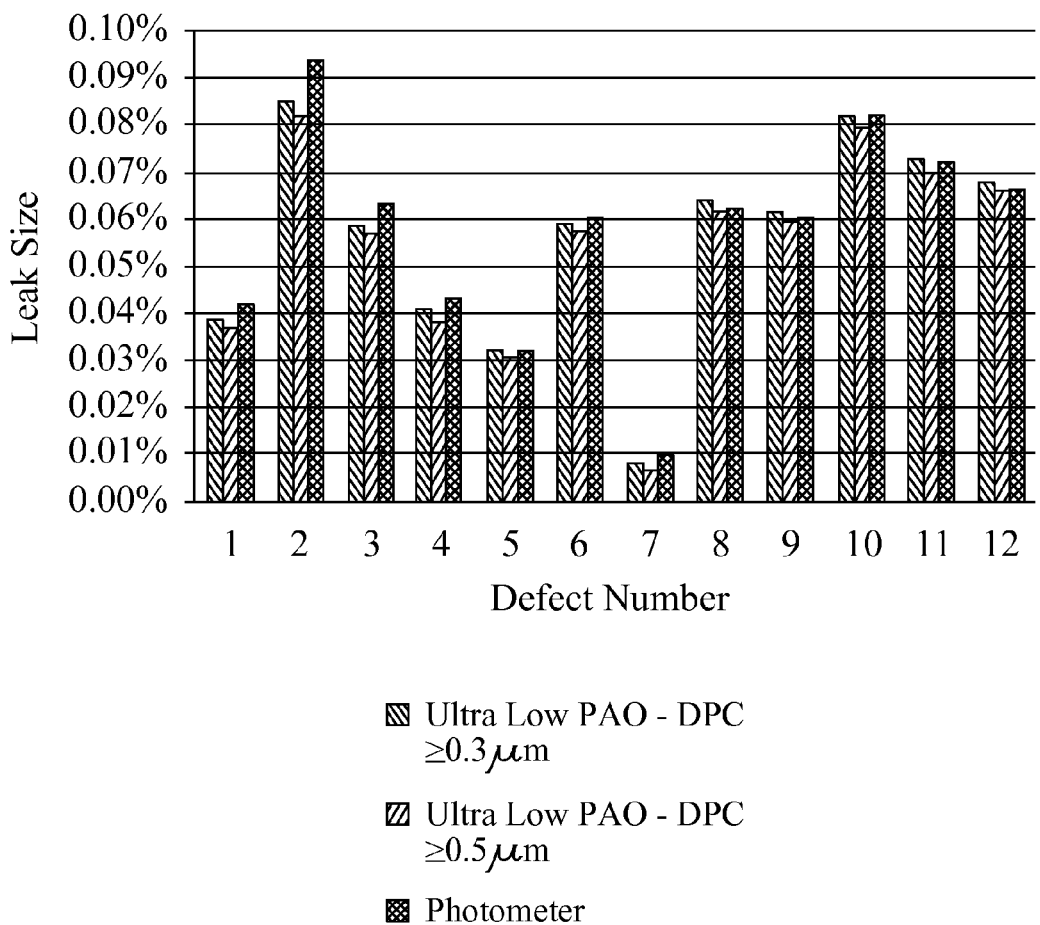
FIG. 16 is a chart illustrating leak size variation by instrument.

The average leak sizes for the three test conditions are shown in FIG. 16. A direct comparison of the test method reveals that the particle counter on average sized the leaks slightly smaller than the photometer for both the >0.3 µm and >0.5 µm particle size distribution conditions. To better understand the repeatability and reproducibility of the measurement and test equipment used in this example, a head-to-head leak size comparison using 10 photometers was carried out. The same comparison was later carried out using 7 particle counters. The results of the study showed that when considering instrumentation variability, there was no statistical difference between the leak sizes obtained for the standard high concentration and ultra low concentrations and test methods presented.

Two test methods were employed to size defects in an ePTFE filter.

Ultra low level (~0.4 µg/l) PAO challenge with a discrete particle counter

Standard level (~10 µg/1) PAO challenge with a photometer. The results indicate that defects in the ePTFE filter can accurately be sized using ultra low level PAO challenges and a particle counter. Under the aforementioned test methods, both DPC test options (≥0.3 µm and ≥0.5 µm particle count defect sizing) performed adequate in comparison to the photometer.

The variation of sizing leaks with a discrete particle counter as set forth in the method herein falls within the variation of the individual photometer tested. The results provide validity to utilizing low PAO concentrations and DPC's to determine leak size in ePTFE filters. Utilizing this methodology, the loading of the filter will take 150-300 times as long based on previous testing.

Bypass Air Study Conditions

Figure 23:
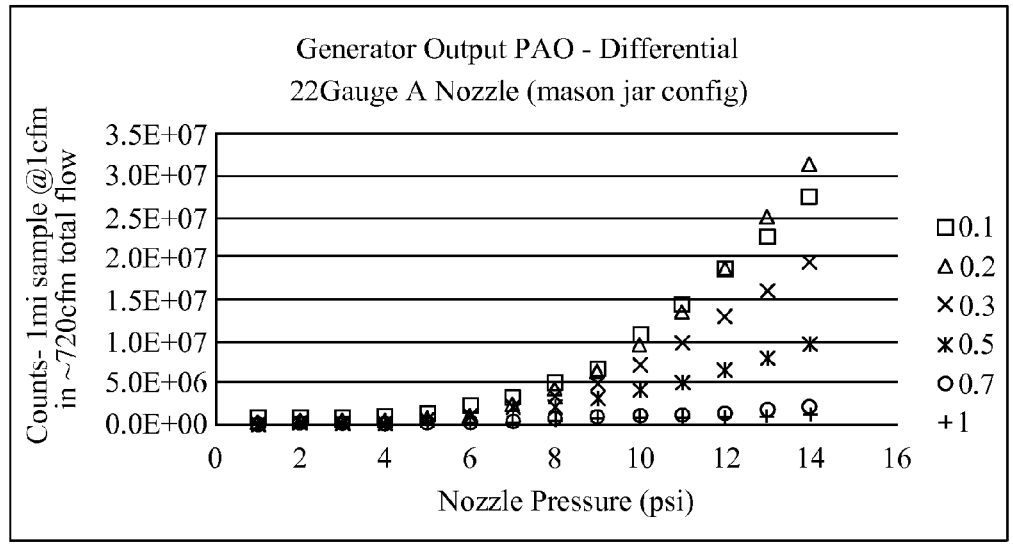
FIG. 23 is a graph of the output performance of a representative test generator without the addition of bypass air, using a 22-gauge capillary nozzle.

FIG. 23 graphically illustrates the results of a representative test generator for measuring output without utilizing bypass air. In FIG. 23 the differential nozzle pressure is shown plotted against the counts for one minute for various particle sizes for the non-bypass configuration of an aerosol generator. The test generator uses a Mason jar with an input flow of approximately 14 psi, a Heise pressure gauge was utilized to measure pressure. A 22-gauge capillary nozzle flush with the port connector was used as the aerosol generation nozzle. The output of the generator was studied using a particle counter. The generator was discharged in a hood system with approximately 720 cfm total flow. Sample outputs were taken at approximately 1 cfm for 30 seconds on the counter. Diluter DP was 4.2 inches $H_2O$ with a dilution factor of 1117.

Figure 24:
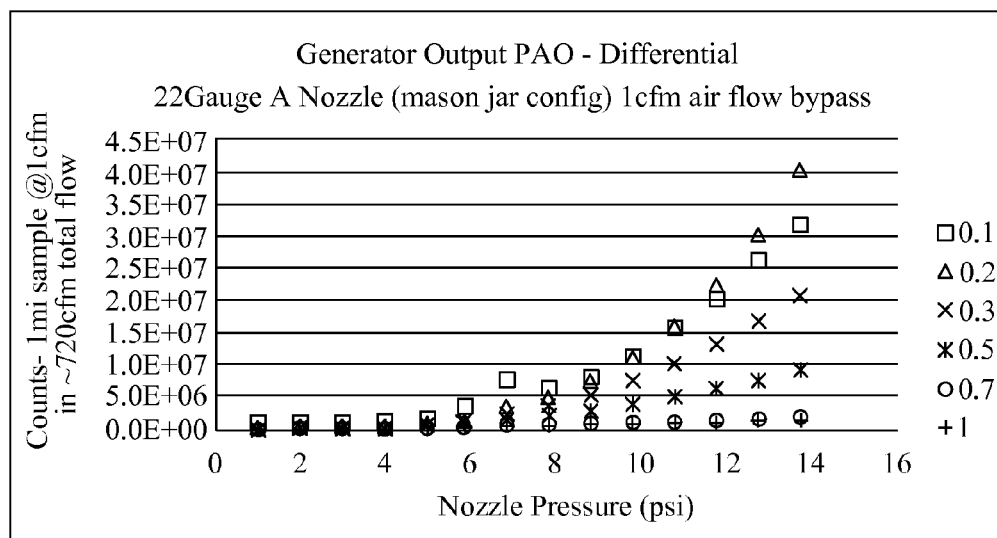
FIG. 24 is a graph of the output performance of a representative test generator with the addition of bypass air similar to that shown in FIG. 18, using a 22-gauge capillary nozzle.
Figure 25:
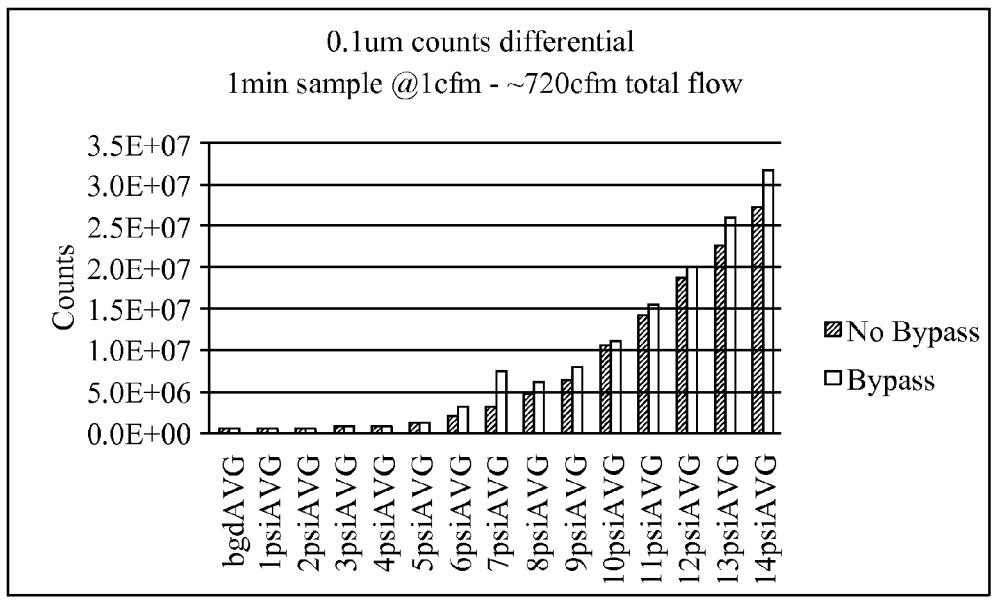
FIG. 25 is a graph of the differential counts of 0.1-0.2 µm particle output concentrations for the test aerosol generators of FIGS. 23 and 24.
Figure 26:
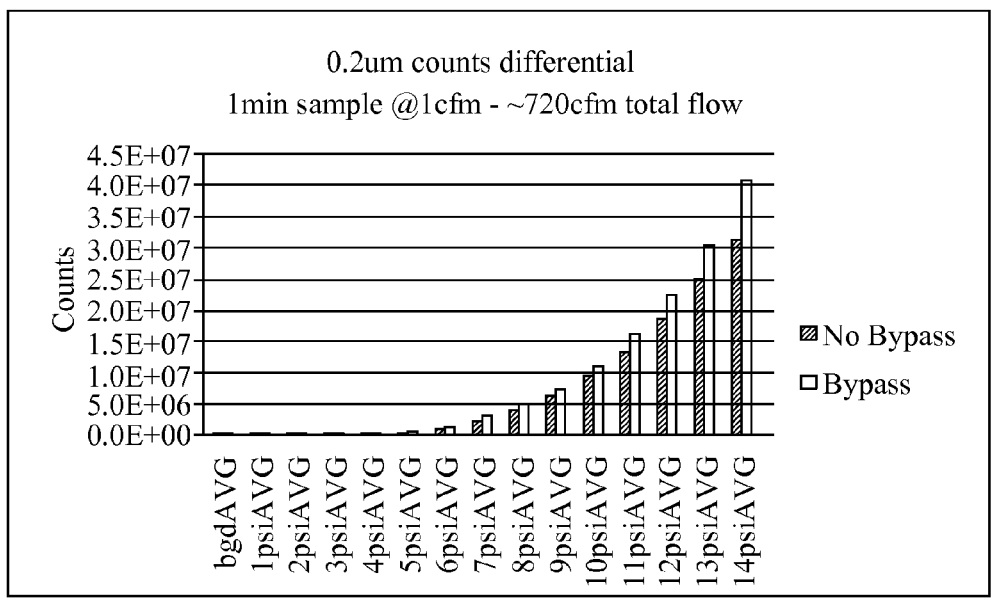
FIG. 26 is a graph of the differential counts of 0.2-0.3 µm particle output concentrations for the test aerosol generators of FIGS. 23 and 24.
Figure 27:
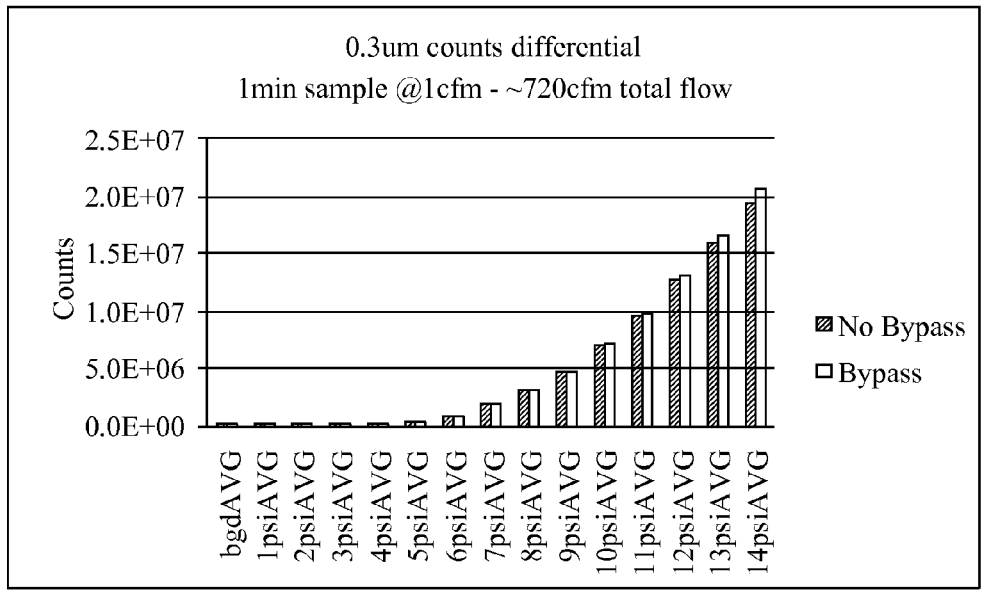
FIG. 27 is a graph of the differential counts of 0.3-0.5 µm particle output concentrations for the test aerosol generators of FIGS. 23 and 24.
Figure 28:
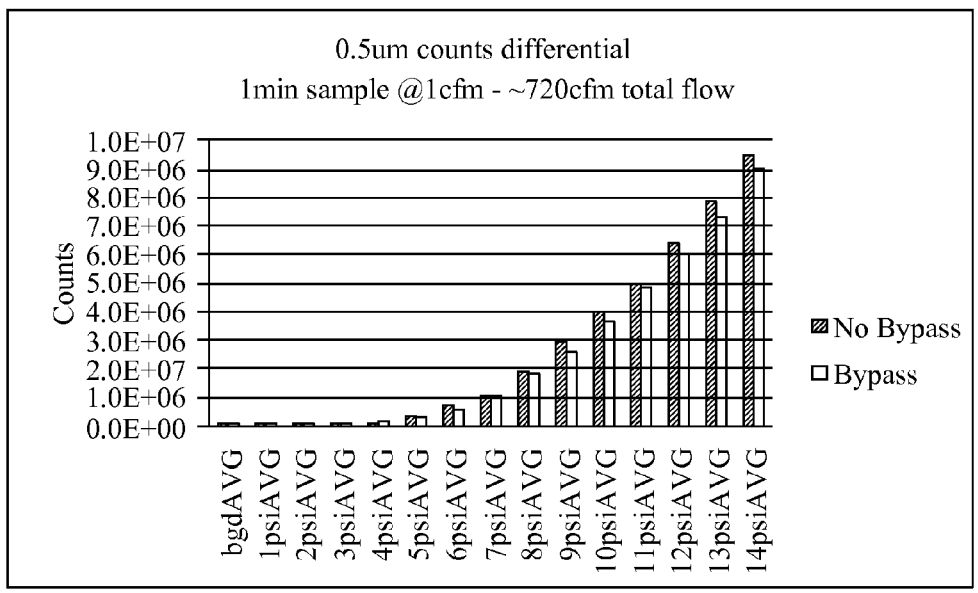
FIG. 28 is a graph of the differential counts of >0.5 µm particle output concentrations for the test aerosol generators of FIGS. 23 and 24.

FIG. 24 graphically illustrates the results of a representative test generator for measuring output utilizing bypass air. In FIG. 24 the differential nozzle pressure is shown plotted against the counts for one minute for various particle sizes for the bypass configuration. In this example using a similar setup to the generator embodiment shown in FIG. 18, a source of bypass air was added which passed through the tank above the surface of the challenge liquid. Samples were again measured at 1 cfm for 30 seconds on the counter. Diluter DP was 4.2 inches $H_2O$ with a dilution factor of 1117. Total flow through the filter was approximately 720 cfm.

The test generators were operated with and without bypass air in order to compare output characteristics (concentration and particle geometries) of the generator. FIGS. 23-24 graphically illustrate the results of the comparison of the above test generator for the non-bypass configuration (FIG. 23) and bypass configuration (FIG. 24). It can be seen that the generation of smaller particles is favored for the configuration using bypass air.

FIGS. 25-28 depict differential counts for 0.1 um, 0.2 um, 0.3 um, and 0.5 um sizes, respectively, shown plotted at various pressures. Again it was determined that bypass configuration favored the output of smaller particles. In particular, it was seen that for the differential plots, there were more, smaller particles in the output for the bypass configuration than for the non-bypass configuration.

Figure 29:
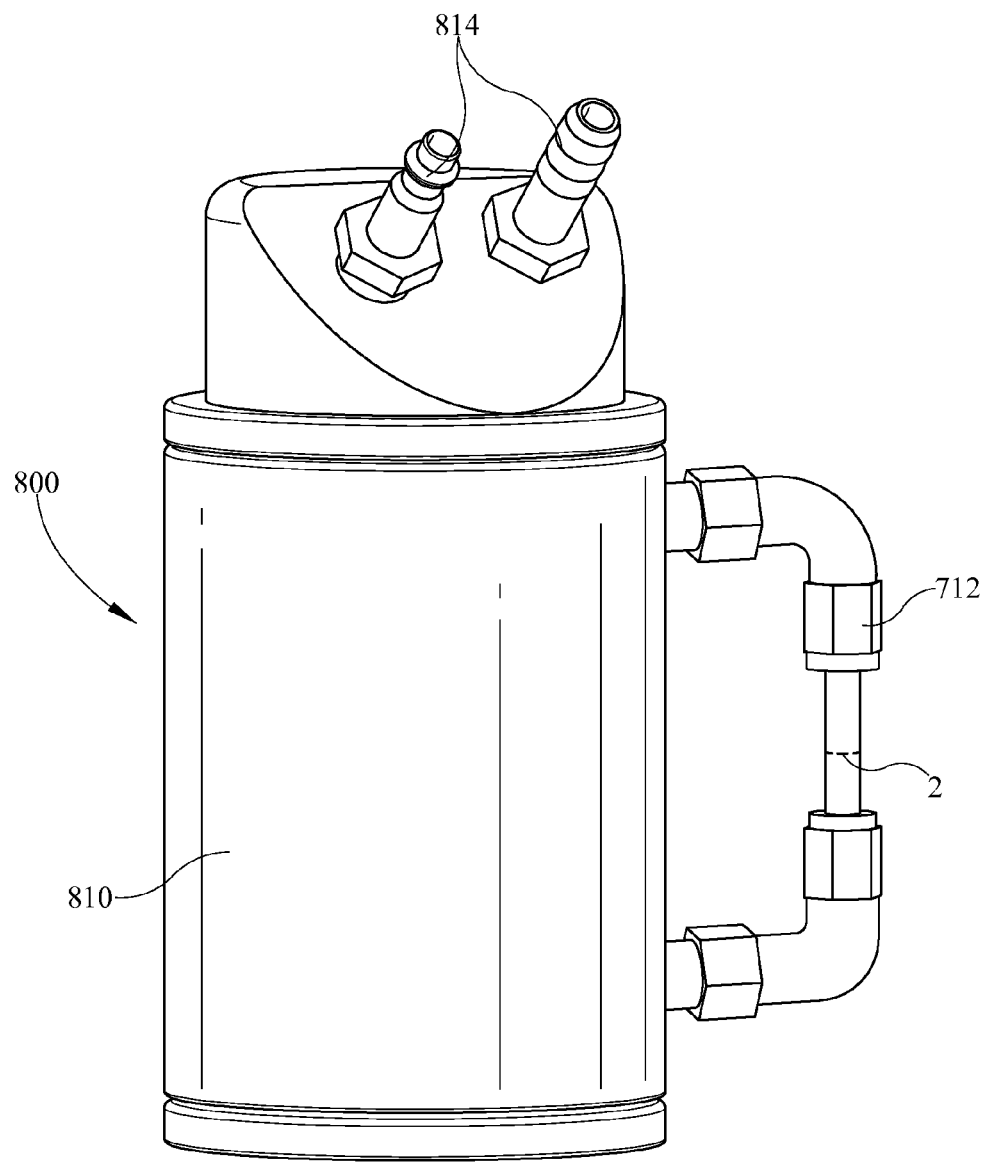
FIG. 29 is a perspective view of another embodiment of an aerosol generator.
Figure 30:
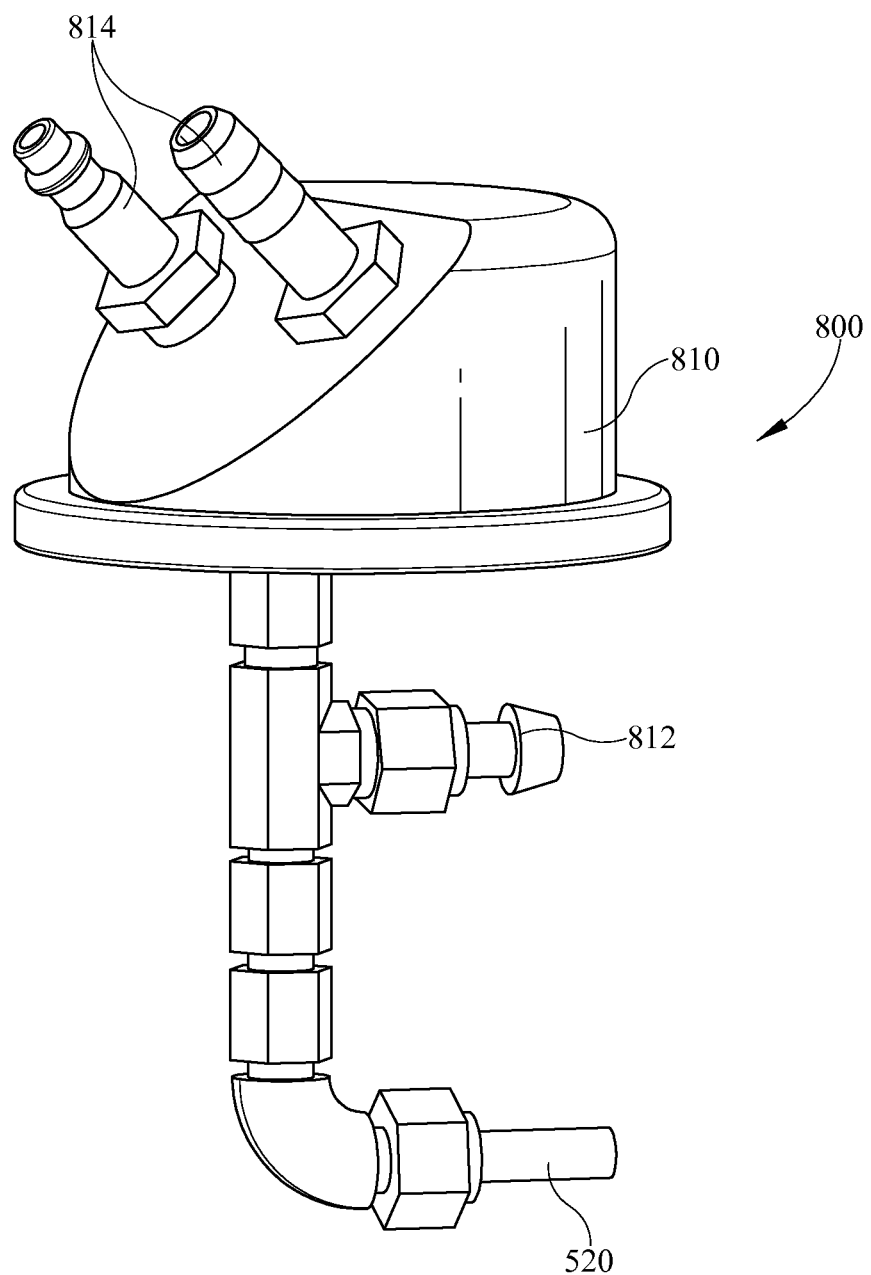
FIG. 30 is a perspective view of the generator of FIG. 29 with portions of the holding tank removed.
Figure 31:
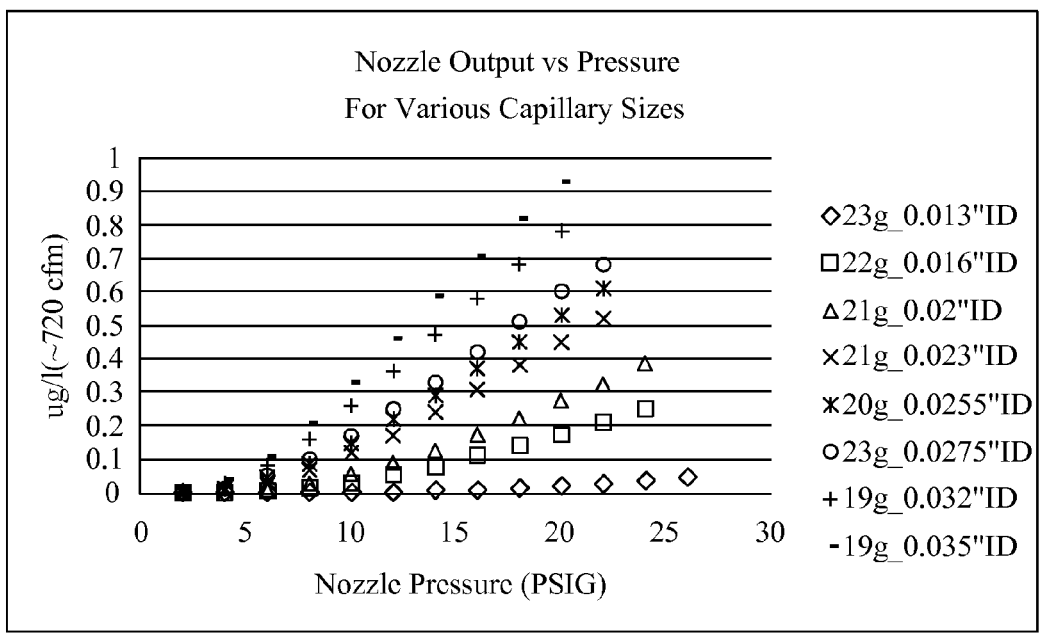
FIG. 31 is a graph of the nozzle output versus nozzle pressure of the embodiment shown in FIGS. 29 and 30 for various size nozzles.

FIGS. 29 and 30 depict an alternative embodiment of a generator 800 according to one aspect of the invention. This embodiment was assembled to study the output of the generation nozzle 520 as a function of nozzle inner diameter and nozzle pressure. The generator tank 810 is shown equipped with a liquid fill level indicator 712 and industrial pressure quick couplings 814. The generator was used to challenge a laminar flow hood operating at ~720 cfm. A photometer (ATI 2G) was used to measure the challenge produced by the generator operating at various pressures and with different generation nozzle sizes. The generation nozzle pressure was set and adjusted using a diaphragm pump and pressure regulator. The amount of bypass flow through the bypass air inlet 812 was a function of nozzle pressure and the flow restrictive device (capillary) located in the bypass air inlet 812. The bypass air inlet 812 contained a capillary tube that would provide enough resistance to maintain the targeted nozzle pressure ranges. FIG. 31 shows the results of the above example. It can be seen that a greater output can be achieved with a larger diameter of nozzle for a given pressure.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for in situ testing of a filtration media comprising:
    a filtration media for positioning within an air stream of an air stream handling system;
    an aerosol generator positioned upstream of said filtration media and having a substantially closed tank configured for containing a liquid therewithin and having a void space above a top surface of the liquid; said aerosol generator having a generation nozzle located in said substantially closed tank having a nozzle outlet located below said top surface of the liquid, said generation nozzle supplying a source of pressurized supply air; said aerosol generator having a bypass nozzle located in said substantially closed tank, said bypass nozzle supplying a source of bypass air; and a tank outlet for discharging an aerosol from said substantially closed tank to said air stream handling system;
    an upstream scanner for detection of said aerosol produced by said aerosol generator at an upstream side of said filtration media; and
    a downstream scanner for detection of said aerosol passing through said filtration media.

2. The system of claim 1, wherein said bypass nozzle is located in said void space above said top surface of the liquid.

3. The system of claim 1, wherein said bypass nozzle is located below said top surface of the liquid.

4. The system of claim 1, wherein said generation nozzle is oriented in a direction parallel to said top surface of the liquid.

5. The system of claim 1, wherein said downstream scanner is a discrete particle counter.

6. The system of claim 1, further comprising an electrical communication between said upstream scanner and said downstream scanner.

7. The system of claim 6, further comprising a microprocessor in communicative relationship with both said upstream scanner and said downstream scanner.

8. The system of claim 1, wherein said filtration media is a HEPA filter.

9. The system of claim 1, wherein said filtration media further comprises an upstream support scrim and a downstream support scrim and an ePTFE membrane interposed between said upstream support scrim and said downstream support scrim.

10. In an air handling system having a filtration media interposed between an upstream environment and a downstream environment, a method of in situ testing of said filtration media comprising the steps of:
    providing an aerosol generator positioned upstream of said filtration media, said aerosol generator having a substantially closed tank configured for containing a liquid therewithin and having a void space above a top surface of the liquid; said aerosol generator having a generation nozzle located in said substantially closed tank having a nozzle outlet located below said top surface, said generation nozzle supplying a source of pressurized supply air; said aerosol generator having a bypass nozzle located in said holding tank, said bypass nozzle supplying a source of bypass air; and a tank outlet for discharging an aerosol from said substantially closed tank to said air stream handling system;
    injecting into said upstream environment said aerosol from said aerosol generator;
    providing an upstream scanner for detection of said aerosol from said aerosol generator at an upstream side of said filtration media;
    providing a downstream scanner at a downstream side of said filtration media for detecting said aerosol passing through said filtration media;
    measuring an upstream concentration of said aerosol in said upstream environment;
    measuring a downstream concentration of said aerosol having passed through a leak in said filtration media in said downstream environment; and
    calculating a leakage rate based on a comparison of said upstream concentration to said downstream concentration.

11. The method of claim 10, wherein said bypass nozzle is located above said top surface.

12. The system of claim 10, wherein said bypass nozzle is located below said top surface.

13. The system of claim 10, wherein said generation nozzle is oriented in a direction parallel to said top surface.

14. The method of claim 10, wherein said downstream scanner is a discrete particle counter.

15. The system of claim 10, further comprising an electrical communication between said upstream scanner and said downstream scanner.

16. The system of claim 15, further comprising a microprocessor in communicative relationship with both said upstream scanner and said downstream scanner.

17. The system of claim 10, wherein said filtration media is a HEPA filter.

18. The system of claim 10, wherein said filtration media further comprises an upstream support scrim and a downstream support scrim and an ePTFE membrane interposed between said upstream support scrim and said downstream support scrim.

* * * * *